US008928783B2

(12) United States Patent
Yoshida

(10) Patent No.: US 8,928,783 B2
(45) Date of Patent: Jan. 6, 2015

(54) IMAGING APPARATUS INCLUDING SWITCHABLE EDGE EXTRACTION

(71) Applicant: Kazuhiro Yoshida, Yokohama (JP)

(72) Inventor: Kazuhiro Yoshida, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 211 days.

(21) Appl. No.: 13/626,347

(22) Filed: Sep. 25, 2012

(65) Prior Publication Data

US 2013/0076936 A1    Mar. 28, 2013

(30) Foreign Application Priority Data

Sep. 26, 2011 (JP) ................................. 2011-208532
Sep. 27, 2011 (JP) ................................. 2011-210876

(51) Int. Cl.
*H04N 5/208* (2006.01)
*H04N 5/232* (2006.01)
*H04N 5/228* (2006.01)

(52) U.S. Cl.
CPC ....... *H04N 5/23219* (2013.01); *H04N 5/23245* (2013.01); *H04N 5/23293* (2013.01)
USPC ................... 348/252; 348/222.1; 348/333.12; 382/266

(58) Field of Classification Search
CPC ........................ H04N 5/23219; H04N 5/23293
USPC .................... 348/252, 222.1; 382/266
See application file for complete search history.

(56) References Cited

U.S. PATENT DOCUMENTS

| 8,600,170 | B2 * | 12/2013 | Kitamura et al. | 382/199 |
| 8,614,752 | B2 * | 12/2013 | Ejima et al. | 348/229.1 |
| 8,619,173 | B2 * | 12/2013 | Miura | 348/333.02 |
| 8,724,919 | B2 * | 5/2014 | Pillman et al. | 382/254 |
| 2010/0259652 | A1 * | 10/2010 | Miura | 348/252 |

FOREIGN PATENT DOCUMENTS

| JP | 9-326025 | 12/1997 |
| JP | 2009-081823 | 4/2009 |
| JP | 2010-016783 | 1/2010 |
| JP | 2010-114556 | 5/2010 |

* cited by examiner

*Primary Examiner* — Ngoc-Yen Vu
(74) *Attorney, Agent, or Firm* — Oblon, Spivak, McClelland, Maier & Neustadt, L.L.P.

(57) ABSTRACT

An imaging apparatus includes an imaging lens configured to form a target optical image of a target, an imaging device configured to acquire a captured image by converting the target optical image formed by the imaging lens into image data by an imaging element, an image processor configured to perform image processing on the captured image acquired by the imaging device, and an image display configured to display an image obtained through the image processor, wherein the image processor has an edge extraction unit, a display processor, and a mode selection unit.

19 Claims, 13 Drawing Sheets

EXAMPLE OF GAMMA CORRECTION CURVE

CHARACTERISTIC OF OUTPUT DEVICE

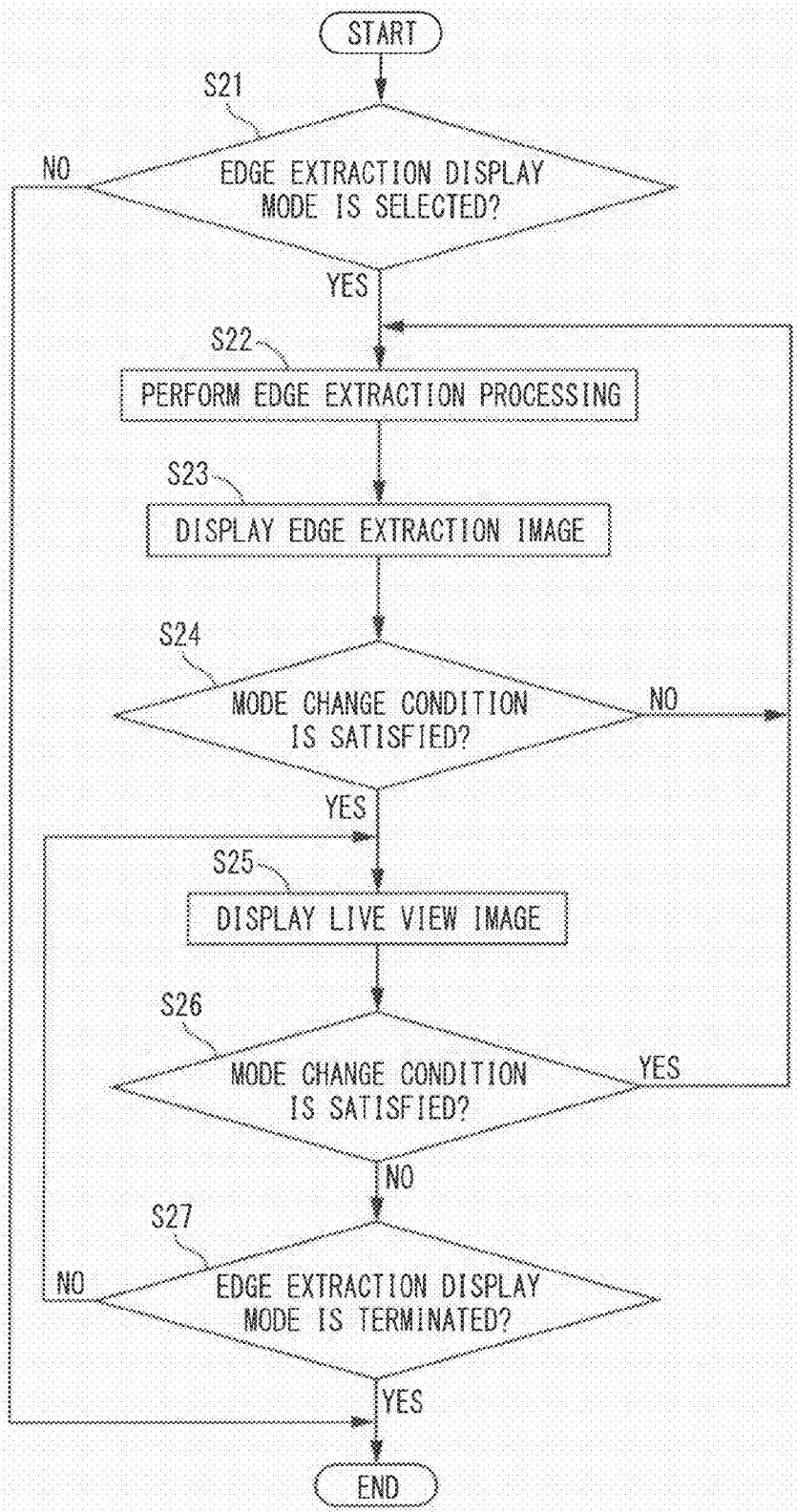

FIG. 11A

NORMAL LPF

| 0 | 2/12 | 0 |
|---|---|---|
| 2/12 | 4/12 | 2/12 |
| 0 | 2/12 | 0 |

FIG. 11B

EDGE EXTRACTION MODE LPF

| 0 | 0 | 0 |
|---|---|---|
| 0 | 0 | 0 |
| 0 | 0 | 0 |

LIVE VIEW IMAGE

EDGE EXTRACTION IMAGE

IMAGING APPARATUS INCLUDING SWITCHABLE EDGE EXTRACTION

PRIORITY CLAIM

The present application is based on and claims priority from Japanese Patent Application No. 2011-208532, filed on Sep. 26, 2011 and Japanese Patent Application No. 2011-210876, filed on Sep. 27, 2011, the disclosures of which are hereby incorporated by reference in their entirety.

BACKGROUND

1. Field of the Invention

The present invention relates to an imaging apparatus suitable as a so-called digital camera, digital video camera, or the like, which takes a still image and a moving image by using an imaging element.

2. Description of the Related Art

Recently, increasing attention has been focused on interchangeable-lens digital cameras including not only a so-called digital single lens reflex camera but also a small-sized mirrorless interchangeable-lens digital camera not using a reflex mirror such as a so-called micro four thirds (trademark: Olympus Imaging) system. In the interchangeable-lens digital camera, a user can enjoy photographing with any of various interchangeable lenses mounted on a camera body.

In the case of interchangeable lenses in a latest model of camera, the interchangeable lenses are manufactured and a camera body under the same standard as a camera body, and the camera body and the interchangeable lenses are provided with electrical contacts, respectively. Thus, the camera body can acquire lens information from the interchangeable lenses through the electrical contacts, and thereby can perform control according to the mounted interchangeable lens or the state thereof. On the other hand, in the case of an old lens used in a so-called silver salt camera or analog camera, or in the case of an interchangeable lens different in optional specifications in the standard from a camera body, the old lens or the like can be mounted on a camera mount if the lens has the same basic specifications such as size or shape as the lens mount. However, there are some lenses not including an electrical contact at all, and some lenses including en electrical contact that does not fit to the electrical contact of the camera body. When such an interchangeable lens having different standard is mounted, the camera body cannot properly recognize the type of lens currently mounted. Thus, a user has to perform adjustment controls such as zooming, focusing, or aperture stop operation of the lens by the manual operation. Also, there is a case where a user wants to bring the camera into focus through manual operation without relying on the autofocus function even when the autofocus function is effective.

The focus adjustment, in particular, requires immediacy to capture an image of an ever-changing target. One of method generally used to check whether accurate focus is achieved is, for example, to enlarge a portion of an image for making it easier to check the focus.

For example, Japanese Patent Application Publication No. 2010-114556 (Patent Document 1), Japanese Patent Application Publication No. 2010-16783 (Patent Document 2), and Japanese Patent Application Publication No. Hei 9-326025 (Patent Document 3) disclose examples of conventional techniques of showing an image on a display with the focus state reflected thereon, which is usable to assist the focus adjustment by the manual operation.

More specifically, Patent Document 1 discloses a technique for improving the focusing accuracy by facilitating the focus adjustment with the manual operation in such a way as to emphatically display edge pixels at an edge portion of a preview image before actual photographing or to enlarge and display one portion of the displayed preview image whose edge portion is emphasized.

Also, Patent Document 2 discloses a technique of allowing a focus state to be easily recognized from a display image by creating an edge component image that is an image of edge components extracted from a reproduced image, and by emphasizing the edge portion in the reproduced image with the created edge component image superimposed on the original reproduced image.

In addition, Patent Document 3 discloses a technique including: recording measurement data on a distance from a camera to multiple regions of a target in association with an image when photographing the image; extracting a target region located at an extraction distance in response to setting of the extraction distance at a desired distance; and setting a background color for regions other than the extracted region. In this way, the region located at the extraction distance can be distinguished on an image or an image can be edited based on the region located at the extraction distance.

As described above, for example, the conventional techniques of reflecting an image focus state on a display as disclosed in Patent Documents 1, 2, and 3 can be utilized to assist the focus adjustment by the manual operation. However, these are for, for example, simply extracting and displaying an edge portion, for emphasizing and displaying an edge portion with the image of the extracted edge portion superimposed on the original image, for enlarging and displaying an edge portion emphasized in the image, for making a region at a particular extraction distance outstanding in the image, and for performing editing processing on the region at a particular extraction distance in the image. Thus, any of these techniques cannot sufficiently present the focus state of a small display image, and cannot greatly facilitate focusing adjustment. Also, when photographing, so-called framing for determining the composition of an image pickup view field is an important element for forming an image, together with the focus adjustment.

SUMMARY

An object of the present invention is to provide an imaging apparatus effectively usable as an electronic finder to provide a live view image for checking a target composition before photographing, and enabling a user to effectively and readily perform framing and focus adjustment while viewing the image.

To achieve the above object, an imaging apparatus according to an embodiment of present invention includes: an imaging lens configured to form a target optical image of a target; an imaging device configured to acquire a captured image by converting the target optical image formed by the imaging lens into image data by an imaging element; an image processor configured to perform image processing on the captured image acquired by the imaging device; and an image display configured to display an image obtained through the image processor, wherein the image processor has: an edge extraction unit configured to obtain an edge extraction image by extracting an edge of the captured image; a display processor having an edge extraction display mode in which the edge extraction image by the edge extraction unit is provided to and displayed by the image display, and a normal image display mode in which the captured image not via the edge extraction unit is provided to and displayed by the image display; and a mode selection unit configured to selectively switch between the edge extraction display mode and the normal image display mode of the display processor based on a predetermined condition.

BRIEF DESCRIPTION OF THE DRAWINGS

The accompanying drawings are included to provide further understanding of the invention, and are incorporated in and constitute a part of this specification. The drawings illustrate embodiments of the invention and, together with the specification, serve to explain the principle of the invention.

FIG. 10 is a flowchart for illustrating mode changing processing in an edge extraction mode in the digital camera in FIG. 1;

FIGS. 11A and 11B are drawings for showing an example of characteristic of a low-path filter to be used for the edge emphasizing processing in FIG. 9 in the digital camera in FIG. 1 and are respectively show a low-path filter characteristic in a normal live view image display mode and a low-path filter characteristic in an edge extraction mode;

DESCRIPTION OF THE PREFERRED EMBODIMENTS

Hereinafter, a preferred embodiment of an imaging apparatus according to the present invention is described in detail by referring to the accompanying drawings. The description is given herein to an embodiment of a digital camera as an imaging apparatus. However, the present invention is not limited to this embodiment, but is generally applicable to image processing such as an image processing IC (integrated circuit) and image processing software for processing an image relating to an electronic device with a camera function or an imaging apparatus.

Figure 1:
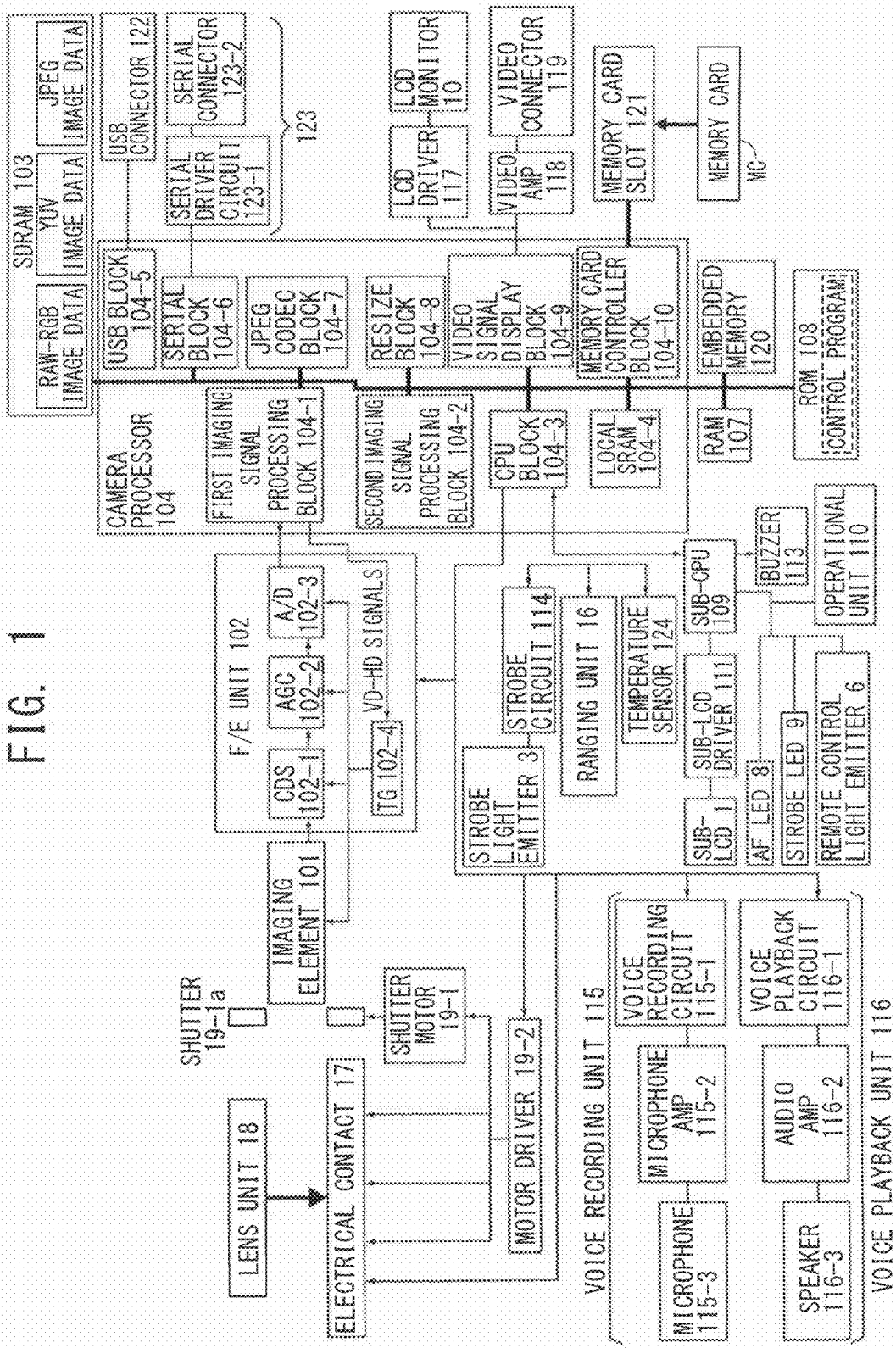
FIG. 1 is a block diagram showing an electronic machine system configuration of a major part of a control system of a digital camera according to one embodiment of an imaging apparatus of the invention.
Figure 2:
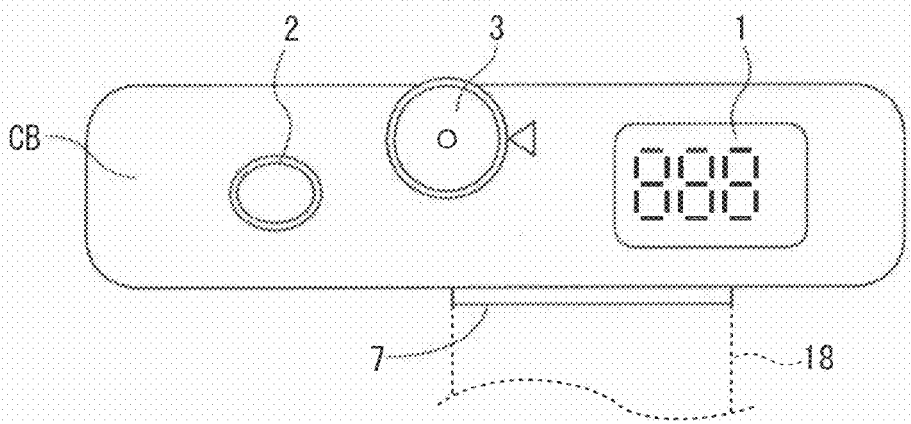
FIG. 2 is a schematic plan view showing a state in which an exterior configuration of the digital camera as shown in FIG. 1 is viewed from the top side.

FIGS. 1 to 4 show a basic configuration of a digital camera as an imaging apparatus according to an embodiment of the present invention. FIG. 1 is a block diagram schematically showing a system configuration of a control system of a digital camera. FIG. 2 is a schematic plan view in which an exterior configuration of the digital camera in FIG. 1 is viewed from above.

Figure 3:
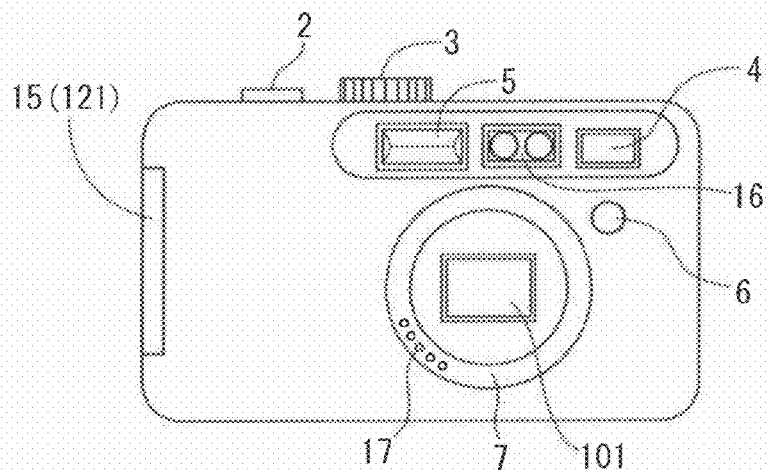
FIG. 3 is a schematic front view showing a state in which the exterior configuration of the digital camera as shown in FIG. 1 is viewed from a front target side.
Figure 4:
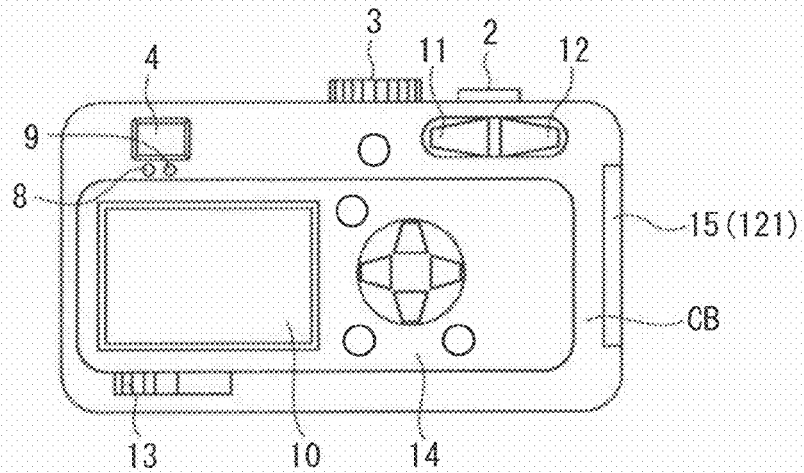
FIG. 4 is a schematic rear view showing a state in which an exterior configuration of the digital camera as shown in FIG. 1 is viewed from a rear photographer side.

FIG. 3 is a schematic front view in which the exterior configuration of the digital camera in FIG. 1 with a lens unit being detached therefrom is viewed from a front target side. FIG. 4 is a schematic rear view in which the exterior configuration of the digital camera in FIG. 1 is viewed from a rear user side.

As the exterior configuration thereof is shown in FIGS. 2 to 4, the digital camera shown in FIGS. 1 to 4 includes a sub-liquid crystal display (sub-LCD) 1, a release button 2, a mode switching dial 3, an optical finder 4, a strobe light emitter 5, a remote control light receiver 6, a lens mount 7, an autofocus display light emitting diode (AF display LED) 8, a strobe display light emitting diode (strobe display LED) 9, a liquid display monitor (LCD monitor) 10, a wide angle side (WIDE) zoom button 11, a telescopic side (TELE) zoom button 12, a power switch 13, operational buttons 14, a memory card slot 15, a ranging unit 16, an electrical contact 17, and a lens unit 18.

Furthermore, as the system configuration for the electronic control is mainly shown in FIG. 1, the digital camera shown in FIGS. 1 to 4 includes an imaging element 101, a front end unit (F/E unit) 102, an SDRAM (synchronous dynamic random access memory) 103, a camera processor 104, a RAM (random access memory) 107, ROM (read only memory) 108, a sub-CPU (sub-central processing unit) 109, an operation unit 110, a sub-LCD diver 111, a buzzer 113, a strobe circuit 114, a voice recording unit 115, a voice playback unit 116, an LCD diver 117, a video amplifier 118, a video connector 119, an embedded memory 120, a memory card slot 121, a USB (universal serial bus) connector 122, and a serial interface unit 123, in addition to the sub-LCD 1, the strobe light emitter 5, the remote control light receiver 6, the lens mount 7, the AF display LED 8, the strobe display LED 9, and the LCD monitor 10.

Although the lens mount 7 is not clearly shown in the drawing, the lens unit 18 in which a zoom optical system including a zoom system and a zoom motor, a focus optical system including a focus lens system and a focus motor, and an aperture stop unit including an aperture stop and an aperture stop motor are embedded is detachably mounted thereon. A shutter unit including a shutter 19-1a and a shutter motor 19-1 and a motor driver 19-2 are included inside a camera body near the lens mount 7, and through the electronic contact 17 provided in this lens mount 7, lens information is acquired from the lens unit 18 mounted on the lens mount 7 or zoom, focus and aperture stop driving signals from the motor driver 19-2 are supplied to the lens unit 18 to respectively drive the zoom motor, the focus motor, and the aperture stop motor. The shutter motor 19-1 is driven by the motor driver 19-2.

The front end unit 102 has a CDS (correlated double sampling unit) 102-1, an AGC (automatic gain controller) 102-2, an A/D (analog-digital) converter 102-3, and TG (timing generator) 102-4.

The camera processor 104 has a first imaging signal processing block 104-1, a second imaging signal processing block 104-2, a CPU (central processing unit) block 104-3, a local SRAM (local static random access memory) 104-4, a USB processing block 104-5, a serial processing block 104-6, a JPEG coding (CODEC) block 104-7, a resize (RESIZE) block 104-8, a video signal display block 104-9, and a memory card controller block 104-10.

The operational unit 110 includes the release button 2 and the mode switching dial 3 shown in FIG. 2 and the WIDE zoom button 11, the TELE zoom button 12, the power switch 13, and the operational buttons 14 shown in FIG. 4.

The voice recording unit 115 has a voice recording circuit 115-1, a microphone amplifier 115-2, and a microphone 115-3. The voice playback unit 116 has a voice playback circuit 116-1, an audio amplifier 116-2, and a speaker 116-3. The serial interface unit 123 has a serial driver circuit 123-1 and a serial connector 123-2.

The sub-LCD 1, the release button 2, and the mode switching dial 3 are disposed on the upper surface of the camera body as shown in FIG. 2. The sub-LCD 1 is used as a display unit for displaying the number of pictures that can be captured. The release button 2 can be pressed down in two steps, in other words, the release button 2 is operable in such a manner that an autofocus (AF) operation is conducted in the first step and when the button is further pressed down to the second step, a photographing operation is conducted. In general, the pressing down operation in the first step is called as "halfway pressing" and the pressing down operation in the second step is called as "full pressing". The mode switching dial 3 switches operation modes of a digital camera, such as a photographing mode and a playback mode.

Also, an object plane of the optical finder 4, the strobe light emitter 5, the remote control light receiver 6, the lens mount 7, and the ranging unit 16 are disposed on the front side of the camera body as shown in FIG. 3. The memory card slot 15 for mounting a memory card such as an SD card is provided on a left side of the camera body when viewed from an object (target) side. The memory card slot 121 is provided inside the memory card slot 15 and a memory card MC is mounted by inserting the memory card MC into the memory card slot 121.

Furthermore, as shown in FIG. 4, an eye piece of the optical finder 4, the AF display LED 8, the strobe display LED 9, the LCD monitor 10, the WIDE zoom button 11, the TELE zoom button 12, the power switch 13, and the operation buttons 14 are disposed on the rear surface side of the camera body. The operation buttons 14 includes a playback button, a frequently using self-timer/an erase button, menu (MENU)/an OK button, up/a strobe button, down/macro button, left/image checking button, right button, a display button for displaying an image, and the like. The up/strobe button, down/macro button, left/image checking button, and right button configures a up-down and left-right button equivalent to an arrow key.

For example, in this digital camera, the MENU button is operated, so that a screen on which various kinds of setting are made is displayed, and then the up-down left-right button is operated with the screen being displayed. Accordingly, a mode can be shifted to a manual focusing mode. After the manual focusing mode is selected, a live view image can be displayed by operating the MENU button again. In the state where the live view image is displayed in the manual focusing mode, for example, the focusing operation can be operated by driving a position of the focus lens system in the lens unit 18 to an arbitral position along the optical axis by the up-down button.

Hereinafter, the control system of the digital camera shown in FIG. 1 is schematically described. The detailed description is mainly given to portions which are important for understanding the present invention, and portions which are relatively not so important for understating the invention are not necessarily described in detail.

The zoom lens system of the zoom optical system and the focus lens system of the focus optical system in the lens unit 18 configure an imaging optical system and form an optical image of a target on a light-receiving surface of an imaging element 110. The motor driver 19-2 is controlled by the CPU block 104-3 of the camera processor 104 and drives the zoom drive motor, the focus drive motor, and aperture stop motor which are in the lens unit 18, and the shutter motor 19-1 which is disposed near the mount 7 inside the camera body.

The imaging element 101 is formed by using a solid-state imaging element, for example, a CMOS (Complementary metal-oxide semiconductor) imaging sensor or a CCD (charge-coupled device) imaging sensor, and performs photoelectric conversion on the optical image of the target and takes it as an electronic image signal. The front end unit 102 is controlled by the CPU block 104-3 of the camera processor 104. The TG 102-4 supplied with a vertical drive signal (VD) and a horizontal drive signal (HD) from the first imaging signal processing block 104-1 of the camera processor 104 generates drive timing signals for the imaging element 101, the CDS 102-1, the AGC 102-2, and the A/D converter 102-3 to respectively drive them at predetermined timing.

The CDS 102-1 removes an image noise by performing correlated double sampling on the image signal output from the imaging element 101. The AGC 102-2 performs the gain adjustment of the image signal on which the correlated double sampling is performed by the CDS 102-1. The A/D converter 102-3 converts the image signal in which the gain adjustment is performed by the AGC 102-2 into a digital signal.

In the camera processor 104, the first imaging signal processing block 104-1 performs the white balance adjustment or the gamma adjustment on the image data captured by the imaging element 101 and output from the front end unit 102 and also supplies the VD signal and the HD signal to the TG 102-4 of the front end unit 102 as described above. The second imaging signal processing block 104-2 performs processing of converting the image data into brightness data and color difference data by the filtering processing. The CPU block 104-3 controls operations of various units of the apparatus as described above. The local SRAM 104-4 temporarily stores data or the like necessary for the above-described control.

Furthermore, in the camera processor 1-4, the USB processing block 104-5 connects with an external device such as a PC (personal computer) according to the USB standards and performs USB signal processing for performing communications with the external device, the serial block 104-6 connects with an external device other than the PC according to the serial communication standards such as RS-232C and performs serial signal processing for performing communications with the external device, the JPEG codec block 104-7 performs JPEG compression/expansion on the image data, the resize block 104-8 expands/reduces the size of the image data by the interpolating processing such as extrapolation/interpolation, the video signal display block 104-9 converts the image data into the video signal for displaying it on an external display device such as the LCD monitor 10 or a television (TV) receiver or the like, and the memory card controller block 104-10 records captured image data in the memory card mounted in the memory card slot 121 inside the memory card slot 15 and performs writing/reading control on the memory card for the playback of the captured image data recorded in the memory card.

The LCD driver 117 is a circuit for driving the LCD monitor 10. The LCD driver 117 has a function to convert a video signal output from the video signal display block 104-9 into a signal for displaying it on the LCD monitor 10. The LCD monitor 10 is a monitor for mainly displaying an image and performs display such as a live view image display for observing a state of a target before photographing, a display for checking the captured image or a playback display for checking/appreciating the image data recorded in the memory card or the built-in memory 120.

Hereinafter, a basic operation of the digital camera shown in FIGS. 1 to 4 is described. In FIGS. 1 and 2, the strobe light emitter 5 and the strobe circuit 114 are used for making up for a light amount when the light amount of natural light or the like on a target is not sufficient. In other words, when photographing is performed in a dark place or a dark target is photographed, the camera processor 104 gives a strobe light emitting signal to the strobe circuit 114 so that the strobe circuit 114 illuminates a target by causing the strobe light emitter 3 to emit light.

The ranging unit 16 obtains target distance information by measuring a distance between the digital camera and a target. The auto-focusing (AF) function in the recent digital camera uses a so-called CCD-AF scheme in which a contrast or the like is detected as a focus evaluation value of a target image formed on the imaging element 101 by the optical system of the lens unit 18 mounted on the mount 7, and the focus lens system of the lens unit 18 is moved to a position where the contrast is the highest to come into focus. However, in the CCD-AF scheme, the contrast is searched by slightly moving the lens. Accordingly, there is a problem such that the focusing operation is slow. For this reason, the information on the distance with the target is always obtained by using the ranging unit 16 and the focus lens system is moved at once based on this distance information, so that the focusing operation is made faster.

The temperature sensor 124 is provided for measuring an ambient temperature and measures a temperature inside and outside the digital camera. When the temperature is abnormally increased, the digital camera is powered off or the contents of controlling the camera are changed with reference to the data of the temperature sensor.

The lens mount 7 is for connecting the exchangeable lens unit 18 with the camera body. There are known a screw type that a screw is cut for each of the lens unit 18 and the lens mount 7 or a bayonet type that a several claws are disposed for each of the lens unit 18 and the lens mount 7 and the lens unit 18 is rotated to be fixed. The electrical contact 17 is for driving the lens in such a manner that the camera body obtains the lens information from the lens mounted thereon or the driving signal such as zoom, focus, or aperture stop from the motor driver 7-5 is transmitted to the lens unit 18.

The ROM 108 stores a control program described by a code decodable by the CPU block 104-3 or a parameter for control. Then, when the digital camera is powered on, the program is mounted on a not shown main memory and the CPU block 104-3 controls the operations of each unit of the apparatus according to the program and temporarily stores the data and the like which are necessary for the control, in the RAM 107 and a local SRAM 104-4 inside the camera processor 104, which is described later. Also, a rewritable flash ROM is used as the ROM 108, so that the control program and the parameter for control can be changed. Accordingly, the version of the functions can be easily upgraded.

The SDRAM 103 temporarily stores the image data when the camera processor 104 performs various kinds of processing on the image data. The stored image data is, for example, RAW-RGB image data taken through the F/E unit 102 in which the white balance setting or the gamma setting is performed by the first imaging signal processing block 104-1, YCbCr image data in which brightness data/color difference data conversion is performed by the second imaging signal processing block 104-2, or JPEG image data in which JPEG compression is performed by the JEPG codec block 104-7.

The memory card slot 121 is a connector slot for detachably loading the memory card MC for storing the captured image data, and the write/read control of the memory card mounted in the memory card slot 121 is performed by the memory card controller block 104-10 via the memory card slot 121. The embedded memory 120 is a memory for storing the captured image data and is provided so as to be capable of storing the captured image data even when the memory card MD is not mounted in the memory card slot 121. The LCD driver 117 is a drive circuit for driving the LCD monitor 10 to be described later. The LCD driver 117 has a function to convert a video signal output from the video signal display block 104-9 into a signal for displaying it on the LCD monitor 10.

The LCD monitor 10 is provided for displaying the image data monitoring a target state before photographing, displaying the image data of the captured image, and displaying the image data recorded in the memory card MC or the embedded memory 120. The video amplifier 118 is an amplifier for performing impedance conversion of a video signal output from the video signal display block 104-9 into an impedance signal of 75Ω or the like. The video connector 119 is a connector for connecting with an external display device such as a television (TV) receiver.

The USB connector 122 is a connector for connecting with an external device such as a PC (personal computer) through USB. The serial interface unit 123 including the serial driver circuit 123-1 and the serial connector 123-2 configures an interface for performing a serial communication with an external device such as PC complying with a standardized conventional serial communication standard, for example, the RS-232 standard. In other words, the serial driver circuit 123-1 is a circuit for performing voltage conversion on the output signal of the serial processing block 104-6. The serial connector 123-2 is a connector for connecting the serial output subjected to the voltage conversion in the serial driver circuit 123-1 with an external device such as PC.

The sub-CPU 109 is a CPU such as, for example, a microprocessor including both ROM and RAM on the same chip and gives the output signal of the operational unit 110 or the remote control light emitter 6 as user operation information to the CPU block 104-3 of the camera processor 104 or supplies a control signal to the sub-LCD 1, the AF display LED 8, the strobe display LED 9, and the buzzer 113 based on the information on the camera state, which is output from the CPU block 104-3.

The sub-LCD 1 is a display unit for displaying the number of images that can be captured, and the sub-LCD driver 111 is a circuit for driving the sub-LCD 1 based on the output signal of the sub-CPU 109, for example. The AF display LED 8 is an LED for displaying a focus state when photographing. The strobe display LED 9 is an LED for displaying a light emitting preparation state as to whether a capacitor for strobe light emission is completely charged and is ready for emitting light. Note that these AF display LED 8 and the strobe display LED 9 may be used for other display purposes, for example, for displaying that the memory card MD is being accessed.

The remote control light emitter 6 receives an optical light signal such as infrared light from a not shown remote transmitter operated by a user.

The user inputs a voice signal through the microphone 115-3 to the voice recording unit 115, and the voice signal input to the microphone 115-3 is amplified by the microphone amplifier 115-2, and then the voice signal amplified by the microphone amplifier 115-2 is recorded by the voice recording circuit 115-1. Also, the voice playback unit 116 converts the recorded voice signal to a signal for output and playback from a speaker by the voice playback circuit 116-1, and the voice signal converted by the voice playback circuit 116-1 is amplified by the audio amplifier 116-2, and the signal amplified by the audio amplifier 116-2 drives the speaker 116-3 to output a voice signal.

Hereinafter, detailed description is provided for the configuration and operation in the digital camera according to one embodiment of the invention configured as described above, which are characteristic of the present invention. The embodiment described herein is not limited but may be implemented in various modified or changed manners within the scope which can be easily arrived at by the people in the art.

[Image Processing]

Figure 5:
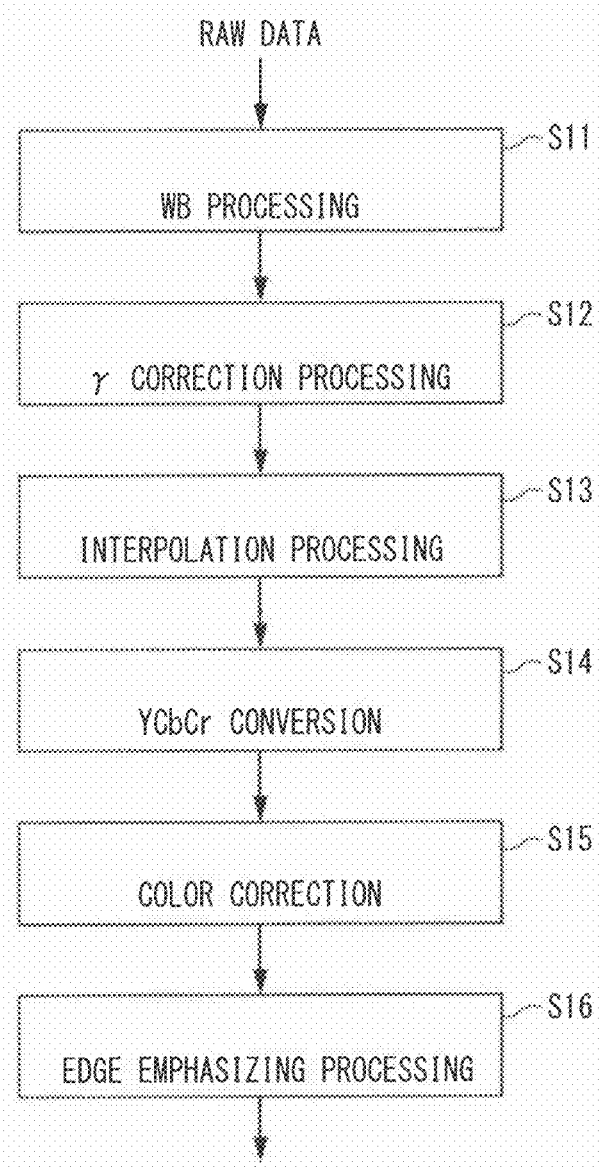
FIG. 5 is a flowchart showing basic image processing in the digital camera in FIG. 1.

The flowchart shown in FIG. 5 shows an entire flow of basic image processing in the digital camera.

The flowchart of FIG. 5 shows one example of general image processing in this type of digital camera. This image processing is executed in the first imaging signal processing block 104-1 and the second imaging signal processing block 104-2 based on the control of the CPU block 104-3 in FIG. 1.

The data which is A/D converted by the A/D converter 102-3 by sampling an image signal output from the imaging element 101 for each pixel by the correlated double sampling in the CDS 102-1 and the automatic gain control in the AGC 102-2 is generally referred to as RAW data because it is in the stage where image processing is not performed. The image data to be input to the image processing unit such as the first imaging signal processing block 104-1 and second imaging signal processing block 104-2 of the camera processor 104 is the RAW data.

[Step S11: White Balance (WB) Processing]

In the flowchart of FIG. 5, the RAW data is firstly subjected to the white balance (WB) processing.

For example, when the CCD imaging sensor is used as the imaging element 101, any one of color filters of red (R), green (G), and blue (B) is respectively attached for each pixel on photodiodes of the CCD imaging sensor in which a light amount from a target is accumulated. Accordingly, these color filters have different transmission light amounts, and thus a charge amount to be accumulated on the photodiode of each pixel differs depending on the colors of the floor filters. Among the three colors of red (R), green (G), and blue (B), green has the highest sensitivity, and red and blue have a lower sensitivity which is about a half as compared with green. In the white balance (WB) processing at step S11, the difference between the sensitivities is compensated and processing to increase a gain for R (red) and B (blue) is performed in order to cause a white portion in the captured image to appear white. Also, a color of an object changes with a color of a light source, and thus a control function to change the gains of R (red) and B (blue) is included so that the white color appears white even if the light source changes.

[Step S12: Gamma (γ) Correction Processing]

Figure 6:
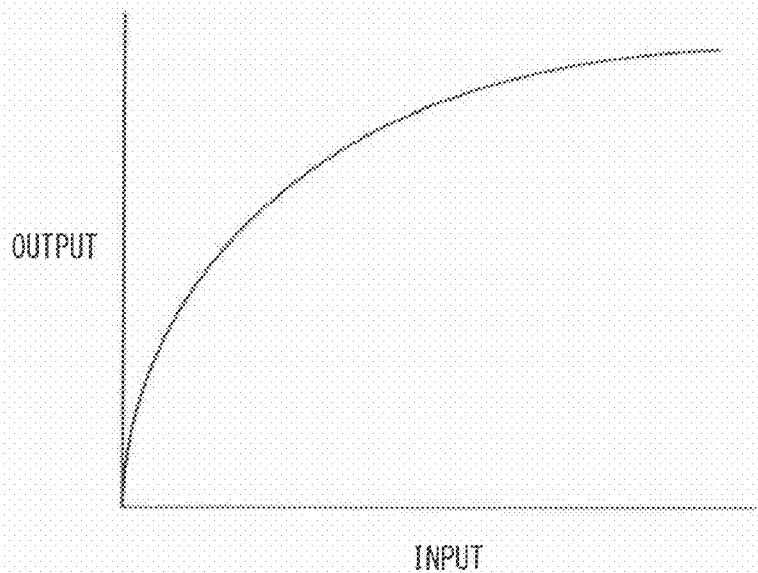
FIG. 6 is a graph of gamma correction characteristics, which shows a gamma correction curve for illustrating gamma correction processing in the digital camera in FIG. 1, in which the horizontal axis is used as an input signal and the vertical axis is used as an output signal.
Figure 7:
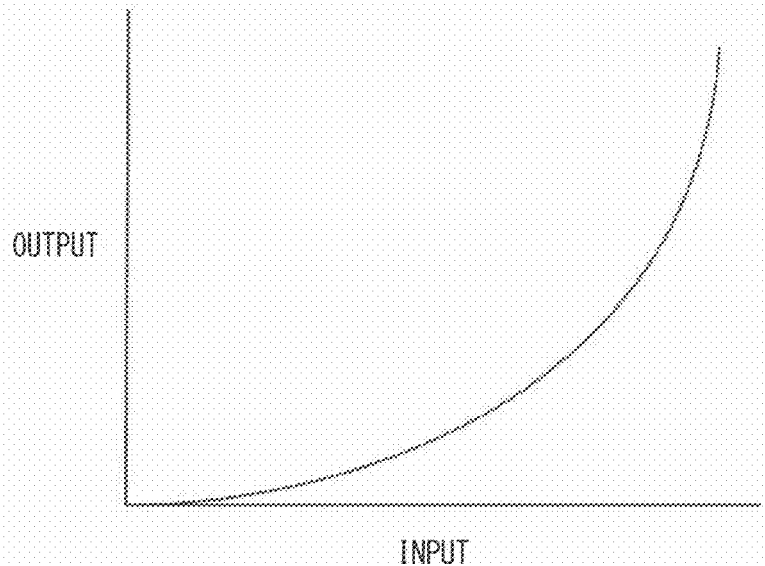
FIG. 7 is a graph of an input output characteristics, which shows characteristics of output with respect to an input in a general image display output device by using the horizontal axis as an input signal and the vertical axis as an output signal, for illustrating the gamma correction processing in the digital camera in FIG. 1.

FIG. 6 shows one example of a gamma correction curve. In FIG. 6, the lateral axis shows an input signal and the longitudinal axis shows an output signal, and non-linear input conversion is performed as shown in the drawing. In general, in a display output device such as an LCD (liquid crystal display) or CRT (cathode-ray tube), as shown in FIG. 7, an output with non-linear characteristics is output with respect to an input. For example, in the case of the non-linear output as shown in FIG. 7, brightness has a poor gradient and an image tends to be dark. Accordingly, a person cannot properly read the image. For this reason, at step S12, the characteristics of the display output device is taken into consideration, and performed is processing that input-output characteristics (gamma curve) negating the non-linear output characteristics are given in advance to the input signal so that the output maintains the linearity. This is gamma correction processing.

[Step S13: Interpolating Processing]

When the imaging element 101 is, for example, a CCD imaging sensor, any one of R (red), G (green), and B (blue) color filters is attached for each pixel in an arrangement referred to as Bayer arrangement. In the RAW data, only one piece of color information exists in one pixel. However, to materialize the image suitable for observation from the RAW data, three pieces of color information of R (red), G (green), and B (blue) are needed for each pixel, and to compensate wanted two pieces of color information, interpolating processing to create color information by interpolating from the peripheral pixels is performed.

[Step S14: YCbCr Conversion Processing]

The image data is in the RGB data format formed of three colors of R (red), G (green), and B (blue) in the stage of the RAW data, but in the YCbCr conversion, the RGB data is converted to the YCbCr data format of a brightness signal Y and color difference signals Cb and Cr. In the JPEG image in a file format generally used in digital cameras or the like, an image is formed from the YCbCr data, and the RGB data is converted to the YCbCr data. In this case, the conversion equation is, for example, as follows.

$$Y=0.299 \times R+0.587 \times G+0.114 \times B$$

$$Cb=-0.299 \times R-0.587 \times G+0.886 \times B$$

$$Cr=0.701 \times R-0.587 \times G-0.114 \times B$$

[Step S15: Color Correction Processing]

Figure 8:
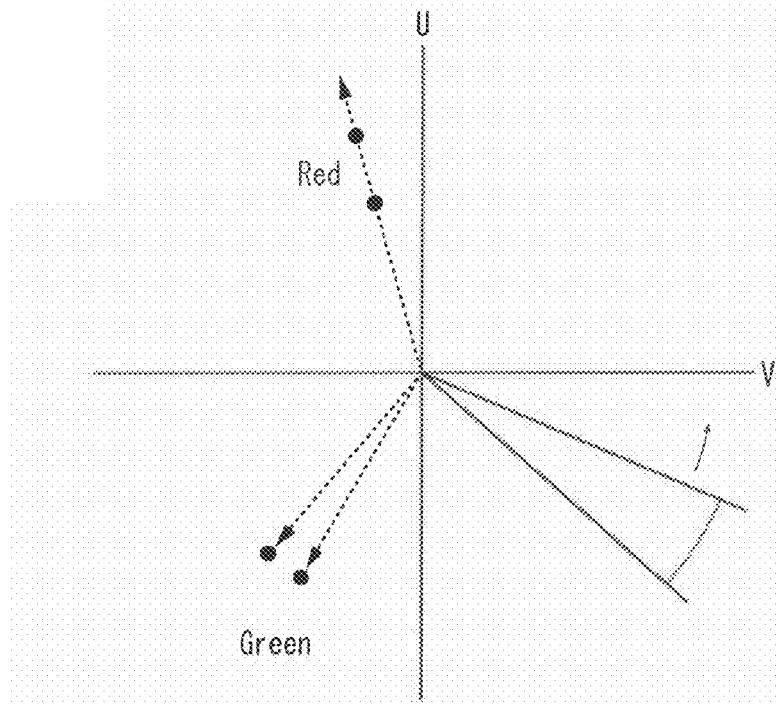
FIG. 8 is a CbCr color space diagram schematically showing color correction in color space for illustrating the color correction processing in the digital camera in FIG. 1.

The color correction includes saturation setting, hue setting, partial hue change setting, and color suppression setting. The saturation setting is parameter setting for determining color intensity. For example, FIG. 8 shows CbCr color space, in which the intensity of red color in the second quadrant becomes higher as the length of a vector from the origin to a red dot becomes longer. Next, the hue setting is a parameter for determining a color tone. For example, even when the lengths of the vectors of the green color are the same in the third quadrant in FIG. 8, if the directions of vectors are different, the color tones are different. The partial hue change setting is setting for rotating a partial color area as shown in the fourth quadrant in FIG. 8. When the saturation becomes higher, the color become deeper but color noise tends to be strong. For this reason, in the color suppression setting, a threshold is provided for, for example, a brightness signal and the color noise is controlled and suppressed with the saturation suppressed in a range having the brightness higher or lower than the threshold.

[Step S16: Edge Emphasizing Processing]

Figure 9:
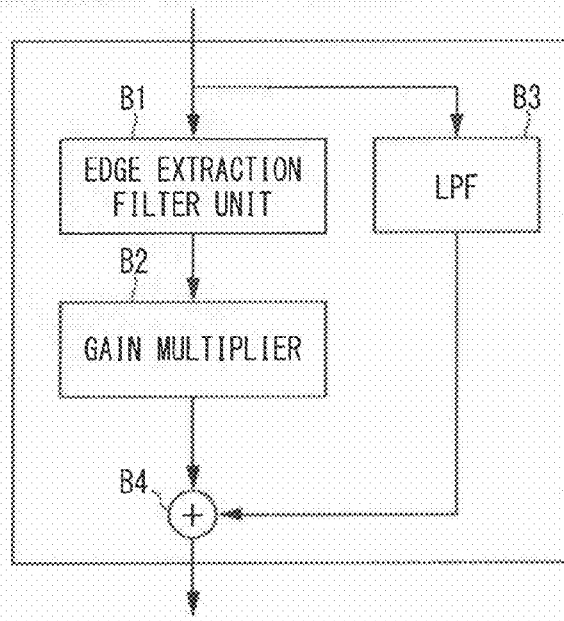
FIG. 9 is a principle block diagram for illustrating edge emphasizing processing in the digital camera in FIG. 1.

The edge emphasizing processing can be illustrated as the block diagram shown in FIG. 9 in which the processing is described schematically. As shown in FIG. 9, the configuration of the edge emphasizing processing includes an edge extraction filter unit B1 to extract an edge portion of an image from the brightness signal Y, a gain multiplier B3 to amplify the edge extracted by the edge extraction filter unit B1 with multiplication of a gain, a low-path filter (LPF) unit B3 to remove a noise composition of the image in parallel with the edge extraction unit B1, and an adder B4 to add the edge extraction data after the gain multiplication with the image data after the LPF processing. The edge strength is determined by a gain of the gain multiplier B2. The larger the gain, the stronger the edge, while the smaller the gain, the weaker the edge. In addition, the edge detection direction or the edge extraction amount changes with filter coefficients of the edge extraction filter B1, which therefore are important parameters. The filter coefficients of the LPF unit B3 reduce the noise in the image by smoothing the image. As the LPF is set stronger, the noise decreases. However, an image resolution tends to deteriorate because the smoothing makes detailed portions unclear.

[Other Image Processing]

In addition to the above-described processing, the image processing includes resize processing to change an image size to an image size to be stored and JPEG compression processing to compress an information amount, and these may be inserted as needed to a portion in the flowchart of FIG. 5.

[Switching Between Edge Extraction Display Mode and Live View Image Display Mode]

Hereinafter, in the digital camera configured as above, a specific description is given to selective switching processing between the edge extraction display mode and a normal live view image display mode (this corresponds to claim 1) which are the characteristics of the present invention. This processing is also performed in the first imaging signal processing block 104-1 and the second imaging signal processing block 104-2 based on the control of the CPU block 104-3 in FIG. 1.

[Flowchart]

FIG. 10 shows a flowchart for illustrating a flow of selectively switching between the edge extraction display mode of the digital camera according to the embodiment and a normal live view image display mode. Note that the selective switching processing routine between the edge extraction display mode and the normal live view image display mode is executed periodically at a predetermined time period or is executed every time any operation relating to the mode change is performed.

In the basic operation of the digital camera according to the embodiment, the live view image is normally displayed in the live view image display mode, and when a user selects the edge extraction display mode by operating the operation unit 110, the mode is shifted to the edge extraction display mode.

Specifically, in FIG. 10, whether the edge extraction display mode is selected by a user is firstly determined (step S21). When the edge extraction display mode is not selected, the processing is terminated and returns to the live view image display mode.

At step S21, when it is determined that the edge extraction display mode is determined to be selected, the edge extraction processing is performed (step S22), the edge extraction image is displayed (step S23), and then determination is made on whether a predetermined condition for changing the display mode from the edge extraction display mode to the live view image display mode is satisfied (step S24).

At step S24, when the predetermined condition for changing the display mode to the live view image display mode is determined to be unsatisfied, the step returns to step S22, and the edge extraction processing and the edge extraction display are repeated to continue the edge extraction display mode. In contrast, when the predetermined condition for changing the display mode to the live view image display mode is determined to be satisfied at step S24, the display mode is changed to the live view image display mode and the live view image display is performed (step S25), and then determination is made on whether a predetermined condition for changing the display mode from the live view image display mode to the edge extraction display mode is satisfied (step S26).

At step S26, when the predetermined condition for changing the display mode to the edge extraction display mode is determined to be satisfied, the step returns to step S22, and the display mode is changed to the edge extraction display mode and the edge extraction processing and the edge extraction display are performed. In contrast, when the predetermined condition for changing the display mode to the edge extraction display mode is determined to be unsatisfied at step 26, determination is made on whether the selection of the edge extraction display mode is terminated (step S27). When it is determined that the selection of the edge extraction display mode is not terminated, the step returns to step S25 and the live view image display is continued. At step S27, when it is determined that the selection of the edge extraction display mode is terminated, the processing goes straight to the termination, and then is returned to the live view image display mode.

In addition, when it is determined that the edge extinction display mode is selected at step S21, the edge extraction processing is performed at step S22, and the edge extraction image is displayed at step S23. However, the steps S32-S37 in FIG. 17 can be performed before step S22 (steps S38, S39 in FIG. 17 correspond to steps S22, S23 in FIG. 10).

[Edge Extraction Display Mode and Live View Image Display Mode]

Individual processing relating to the mode change between the edge extraction display mode and the live view image display mode is described further in detail.

Firstly, a difference between the edge extraction display mode and the live view image display mode is described.

In the live view image display mode, a series of image processing as described above is performed on the image acquired in substantially real time via the imaging element 101 for checking a target composition (framing) before photographing, and the image is displayed on an image display such as LCD monitor 10 or the like. On the other hand, in the edge extraction display mode, the image processing is changed to be different from the image processing of the image to be displayed in the live view image display, and an image in which the edge of the live view image is extracted is displayed.

As described above, in the digital camera according to the embodiment, the live view image is normally displayed in the live view image display mode, and when a user selects the edge extraction display mode by operating the operation unit 110, the mode is shifted to the edge extraction display mode.

Partially different from the edge emphasizing processing shown in FIG. 9, the edge extraction from the live view image is adopted so that the processing result of the LPF unit B3 is not output by performing the filtering by the edge extraction filter unit B1 with respect to the brightness signal and the gain multiplication processing by the gain multiplier B2.

Figure 12A:
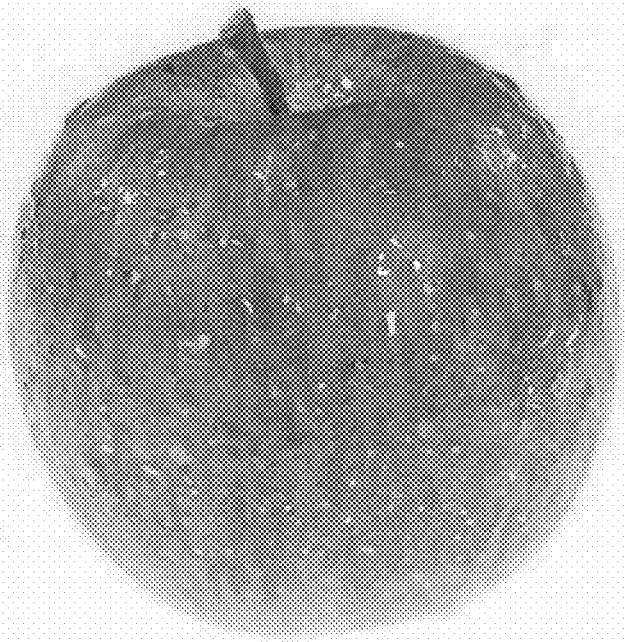
FIGS. 12A and 12B are drawings for showing an example of the displayed image by the edge emphasizing processing in the digital camera in FIG. 1 and are respectively show a displayed image in a normal live view image display mode and a displayed image of the edge extraction image in the edge extraction mode.

For example, the LPF unit B3 performs processing with filter coefficients as shown in FIG. 11A in the normal live view image display and performs processing with all the LPF filter coefficients of 0 as shown in FIG. 11B in the edge extraction display mode. In doing so, the processing result by the LPF unit B3 is 0, and the edge extraction image in which only the edge of the live view image is extracted can be provided for display. For example, the live view image as shown in FIG. 12A becomes an image in which only edges are extracted as shown in FIG. 12B in the edge extraction display mode.

[Selective Usage of Live View Image Display Mode and Edge Extraction Display Mode]

Figure 12B:
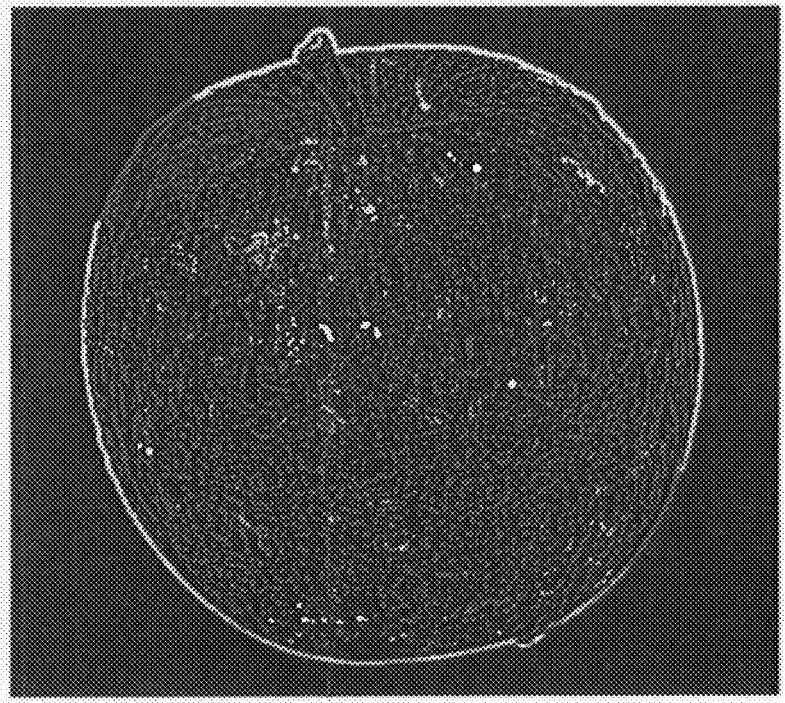

In the edge extraction display mode, since all the filter coefficients set to 0 are used as shown in FIG. 11B, the image becomes only an edge as shown in FIG. 12B and is displayed in monotonous color. This monotonous display is excellent in visibility of edges when focusing. On the other hand, since the display is different from the original color and gradation, the target has to be judged only by the edge and is not suitable for checking the target or checking the composition. For this reason, the live view image display mode and the edge extraction display mode are automatically switched according to the predetermined condition in the present embodiment, so that the display is always performed so as to be suitable to the circumstances. Accordingly, the edge extraction display mode and the live view image are switched according to the predetermined conditions, so that advantages of both the edge extraction display mode and the live view image display mode can be utilized and the display can compensate for the shortcomings.

[Display Mode Change Condition]

Hereinafter, described is various conditions relating to the change of the display modes of the live view image display mode and the edge extraction display mode, in other words, a condition for the display mode change of the edge extraction display mode to the live view image display mode (a condition for determination at step S24 in FIG. 10) and a condition for the display mode change from the live view image display mode to the edge extraction display mode (a condition for the determination at step S26 in FIG. 10).

[Edge Extraction Result]

Firstly, a case where an edge extraction result is used as a condition (this corresponds to claim 2) is described.

In the edge extraction display mode, the processing is performed by the edge extraction filter unit B1 and the gain multiplier B2 shown in FIG. 9 to extract an edge by changing the image processing from the live view image, and all the LPF filter coefficients in the LPF unit B3 are set to 0 so as not to output the filtering result. In this manner, a threshold for a level range is set in advance for the edge extraction result after the extracted edge extraction filter processing and the gain multiplication processing. As a method of setting a threshold, for example, the edge extraction result may be compared with the threshold for each pixel, or an average of the edge extraction results of the entire screen may be compared with the threshold. When the edge extraction result is outside the level range defined by the threshold, the edge extraction display mode is used. When the edge extraction result is within the level range defined by the threshold, the display mode is changed to the normal live view image display mode.

This is because there is no benefit to continuously perform display in the edge extraction display mode in the circumstances where the absolute value of the edge extraction result is excessively small or the edge extraction result is hardly outputted. In such a case, the display mode is automatically changed to the live view image display mode so that the target confirmation can be easily performed with the edge confirmation stopped.

In this manner, the edge extraction result level is set to be a condition for the display mode change, and then, for example, the threshold is set in advance to be the edge extraction result level. When the edge extraction result level is smaller than the threshold, the display mode is automatically changed from the edge extraction mode to the live view image display mode. Accordingly, under the circumstance where the edge extraction result is excessively small or is hardly output, even when the edge extraction display mode is selected, the display mode is changed to the live view image display mode so that the target confirmation can be performed with the edge confirmation stopped.

<Target Brightness>

Also, a case where target brightness is used as a condition (this corresponds to claim 3) is described.

In this case, a brightness average value of a target is calculated from the live view image and a threshold for a brightness range is set in advance for the brightness average value. An image pickup view filed is changed by changing a direction of the digital camera. When the brightness of the live view image is changed in a case where the composition is changed, a brightness average value is changed. For example, when the target brightness is bright to exceed a lower limit threshold and be within the range of the set brightness range, the edge extraction display mode is used, while when the target is dark and the target brightness value is smaller than the lower limit threshold and is outside the range of the set brightness range, the display mode is changed to the normal live view image display mode. The reason is that when the target brightness is dark, the edge is difficult to check. Accordingly, there is no benefit to continuously display in the edge extraction display mode. In such a case, the display mode is automatically changed to the live view image display mode so that the edge confirmation is stopped and the target confirmation can be performed.

In this manner, the target brightness is set to be a condition for the display mode change, and then, for example, the threshold is set in advance to be the target brightness value. When the target brightness becomes smaller than the threshold, the display mode is automatically changed from the edge extraction display mode to the live view image display mode. In this manner, when the target brightness is dark, the edge confirmation becomes difficult, but even when the edge extraction display mode is selected, the display mode is changed to the live view image display mode, so that the target confirmation can be performed with the edge confirmation stopped.

<Imaging Element Gain>

Hereinafter, the description is given to a case where a gain value of the imaging element 101 is used as a condition (this corresponds to claim 4).

In general, in this type of digital cameras and the like, a gain value of the imaging element is adjusted and controlled according to target brightness in the live view image. When the target brightness is dark, the gain value is changed to be a higher value to increase brightness of the image for higher visibility. For this reason, a threshold value is set in advance for the gain value range of the imaging element 101. As similar to the above-described case of the target brightness, the image pickup view filed is changed by changing the direction of the digital camera, and when the brightness of the live view image is changed when the composition is changed, the gain value of the imaging element 101 is changed. Accordingly, for example, when the target brightness is bright and the gain value becomes equal to or smaller than the upper limit threshold within the range of the set gain value range, the edge extraction display mode is selected, while the target is dark and the gain value exceeds the upper limit threshold to be outside the range of the set gain value range, the normal live view image display mode is used. The reason is that in the edge extraction display mode, the strong edge emphasizing processing is performed for increasing the visibility of the edge, and when the target brightness is dark and the gain value is high, the live view image display mode is automatically selected, so that an image with many noises along with the edge extraction is effectively prevented from being displayed.

In this manner, the gain value of the imaging element 101 is set to be a condition for changing the display mode, so that, for example, a threshold is set in advance for the gain value of the imaging element 101 and when the gain value of the imaging element 101 exceeds the threshold, the display mode is automatically changed from the edge extraction mode to the live view image display mode. In the edge extraction display mode, the strong edge emphasizing processing is performed for increasing the visibility of the edge, and thus an image has a high gain value of the imaging element 101 and includes many noises. However, even when the edge extraction display mode is selected, the live view image display is used when the gain value of the imaging element 101 is high, so that the image with many noises in the edge extraction display does not need to be displayed.

<Threshold Setting Method>

A method of setting thresholds for the above-described edge extraction result level range, target brightness range, and gain value range of the imaging element is further described in detail. Note that, a range and thresholds for defining the range are individually set for each of the edge extraction result level, the target brightness, and the gain value of the imaging element. As for a set value of the threshold, a fixed value set in advance may be held in the ROM 108 in the camera and be used by reading it in the RAM 107 or the SDRAM 103 from the ROM 108, or may be changed as needed and be set in such a manner that the user operates the operational unit 110.

Figure 13:
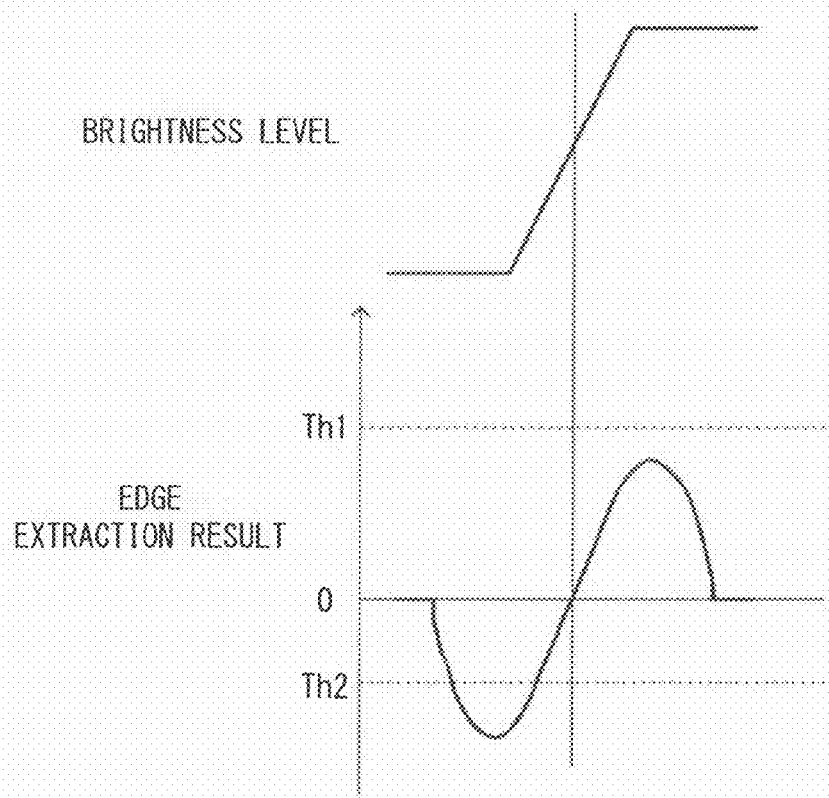
FIG. 13 is a graph for illustrating a method of setting a threshold to determine a level range for switching between an edge extraction display mode and a normal image display mode according to the level of the edge extraction result in the digital camera in FIG. 1.

Firstly, a method of setting the threshold for the level range of the edge extraction result is described. The edge extraction result includes a case where it is output positively and a case where it is output negatively according to the form of the edge as shown in FIG. 13. With respect to such edge extraction result level, as a threshold for dividing the edge extraction result level, both a threshold Th1 on the positive side and a threshold Th2 on the negative side are made settable as shown in FIG. 13. When it is actually set, both the threshold Th1 on the positive side and the threshold Th2 on the negative side may be set or any one of these may be set. If only one of them is set, the other threshold is set to a maximum value if the other threshold is the threshold Th1 on the positive side and is set to a minimum value if it is the threshold Th2 on the negative side.

Figure 14:
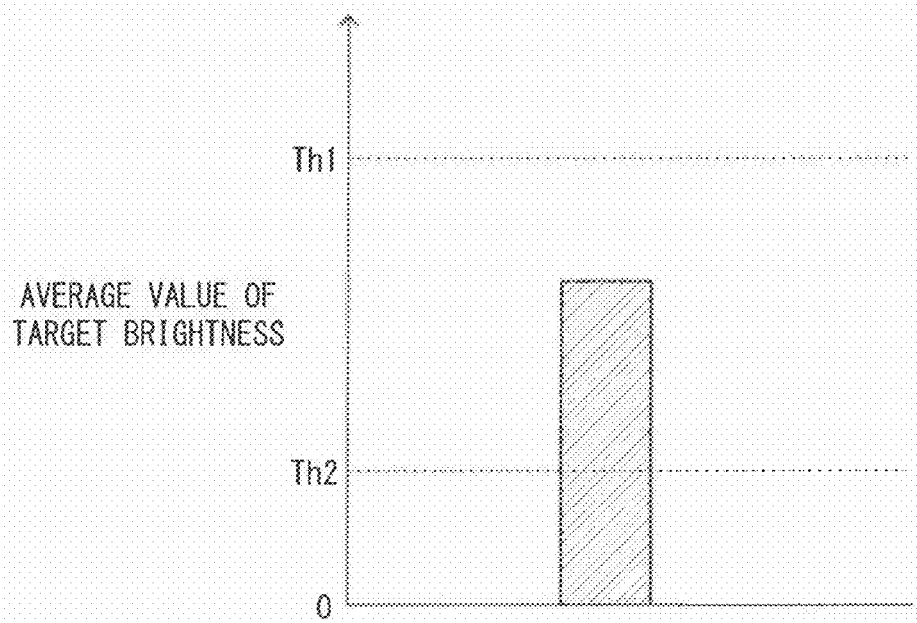
FIG. 14 is a graph for illustrating a method of setting a threshold to determine a target brightness range for switching between an edge extraction display mode and a normal image display mode according to the level of the target brightness in the digital camera in FIG. 1.

In addition, description is provided for a method of setting thresholds for a brightness value range of the target brightness. As shown in FIG. 14, upper and lower limit thresholds Th1 and Th2 to define a brightness range are set for the brightness average value of the target which is calculated from the live view image. As such thresholds to define the brightness range, both the threshold Th1 that is an upper limit on the bright side and the threshold Th2 that is a lower limit on the dark side are made settable. In the actual setting of these thresholds, either or both of the upper limit and the lower limit may be set. In the case of setting only one of the thresholds, the other unset threshold is set to a maximum value if the other threshold is the upper-limit threshold Th1 and is set to a minimum value if it is the lower-limit threshold Th2.

Figure 15:
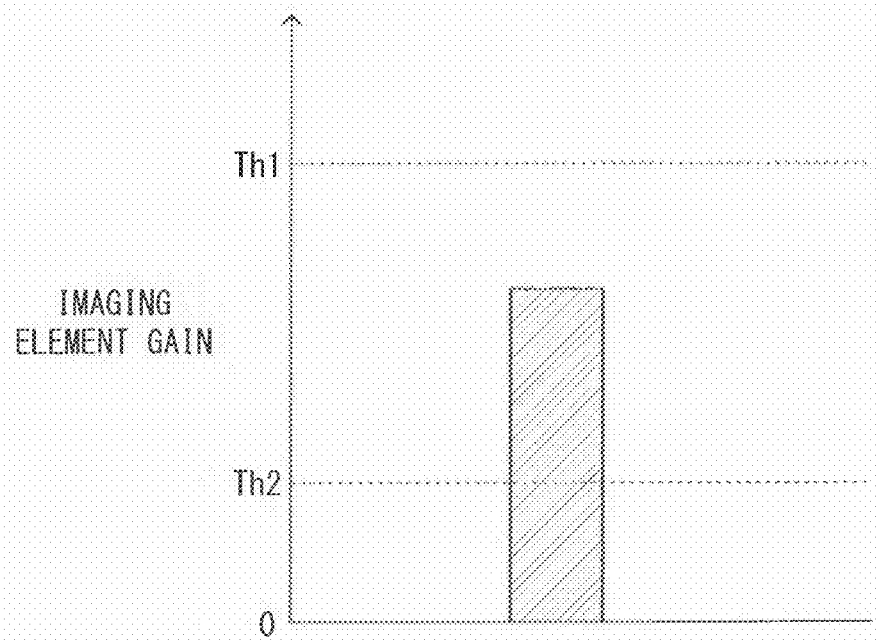
FIG. 15 is a graph for illustrating a method of setting a threshold to determine a gain value range for switching between an edge extraction display mode and a normal image display mode according to the gain value of an image capture element in the digital camera in FIG. 1.

Then, description is provided for a method of setting thresholds for a gain value range of the imaging element 101. As shown in FIG. 15, upper and lower limit thresholds Th1 and Th2 to define the gain value range are set for the gain value of the imaging element 101 used in the live view image. As such thresholds to define the gain value range, the following two thresholds are made settable: an upper-limit threshold Th1 on the side where the gain value is set to a high value because the target is dark; and a lower-limit value on the side where the gain value is set to a low value because the target is bright. In the actual setting of these thresholds, either or both of the upper limit and the lower limit may be set. In the case of setting only one of the thresholds, the other threshold is set to a maximum value if the other threshold is the upper-limit threshold Th1 and is set to a minimum value if it is the lower-limit threshold Th2.

<Evaluation Value Acquisition Method and Threshold Determination Method>

Figure 16:
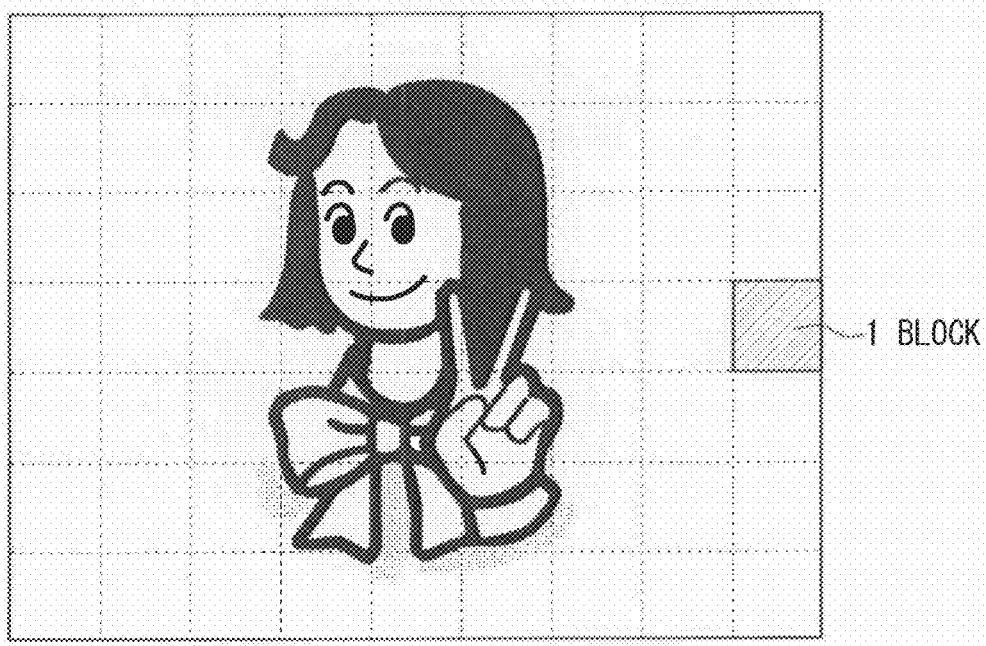
FIG. 16 is a drawing for illustrating a block division of a captured image used when a value for each block region of the captured image is used for determining a level range of the edge extraction result or a target brightness range in the digital camera in FIG. 1.

As for the edge extraction result and the target brightness, an average value of the entire screen may be used for the live view image when the evaluation value is acquired and the threshold is determined, or, as shown in FIG. 16, the screen region is divided into blocks in the horizontal direction and the vertical direction and an average is calculated for each block region the calculated result is used for the live view image.

When the average value of the entire screen is used, a comparison between an evaluation value D and the threshold is performed to determine a display mode where the edge extraction result or the evaluation value of the target brightness is set to be D.

As described above, when the evaluation value D is within the range defined by the two thresholds (Th2<D<Th1) with respect to the two upper-limit and lower-limit thresholds, the edge extraction display mode is used. When the evaluation value D is outside the range defined by the two thresholds (Th2>D or D>Th1), display is made in the live view image display mode.

When the image is evaluated in units of blocks into which the screen is divided, the evaluation value D of the edge extraction result or the target brightness is calculated for each block and the evaluation value D and the thresholds are compared with each other for each block.

When the result of the comparison between the evaluation value D and the threshold D for each block is used, the following various control methods are possible.

(1) Control change to be performed when even just one block is outside the range between the thresholds. Specifically, in the edge extraction display mode, the evaluation value D and the thresholds are compared with each other for all the divided blocks. When even one of all the blocks is outside the range defined by the thresholds (Th2>D or D>Th1), the display mode is changed from the edge extraction display mode to the live view image display mode.

(2) Control change to be performed when a predetermined number of blocks or more are outside the range between the thresholds. In other words, in the edge extraction display mode, the evaluation value D and the thresholds are compared with each other for all the divided blocks and the number of blocks outside the range defined by the thresholds (Th2>D or D>Th1) is counted. Here, a threshold is also set in advance for the number of blocks outside the range between the thresholds. Then, when the number of blocks outside the range between the thresholds exceeds the threshold for the number of blocks, the display mode is changed from the edge extraction display mode to the live view image display mode.

(3) Control change to be performed when a specific block is outside the range between the thresholds. Specifically, in the edge extraction display mode, one or more specific blocks are focused among the divided blocks, and the evaluation value D and the thresholds are compared with each other only for those blocks. When just one of the specific bocks is outside the range defined by the thresholds (Th2>D or D>Th1), the display mode is changed from the edge extraction display mode to the live view image display mode. In this case, as for the selection of specific blocks, the specific blocks may be selected and set in advance and be held in the ROM 108 or may be selected by a user as needed.

Also, as for the imaging element gain, an equal gain is applied on an entire output image of the imaging element 101. Accordingly, when the imaging element gain is used as the evaluation value D, the evaluation value D and the two thresholds are compared with each other. In the edge extraction display mode, when the evaluation value D is within the range defined by the two thresholds (Th2<D<Th1), the edge extraction display mode is used, and when the evaluation value D is outside the range defined by the thresholds (Th2>D or D>Th1), the live view image display mode is used.

<Combined Control>

As described above, the results of individual comparisons with the threshold are determined if the control is changed with respect to three elements of the edge extraction result level, the target brightness, and the gain value of the imaging element. In addition to this, the control can be performed by combining these elements as needed.

For example, the following priority is given to the control changes for the three elements.

Imaging element gain value<Target brightness<Edge extraction result level

Then, even when one or both of the elements having a lower priority (the target brightness and the imaging element gain value) is/are in the range outside the range defined by the thresholds, if the edge extraction result level having the highest priority is not in the range outside the range defined by the thresholds, the control is not changed. On the other hand, when the edge extraction result level having the highest priority becomes outside the range defined by the threshold, if any one of the element having a lower priority is not outside the range defined by the threshold, the control is not changed.

In this manner, the control is not changed when only the element having a lower priority applies for the control change or only the element having the highest priority applies for the control change. Although the display mode may be frequently switched when the control is changed based on an individual determination on each element, the problem can be suppressed by performing the control using the elements in a combined manner.

<Release Button Operation>

Hereinafter, the description is given to a case where an operational state of the release button is used as a condition (this corresponds to claim 5).

In general, in this type of digital camera, the release button 2 is a switch which is operable in two steps. Specifically, the pressing operation in the first step, in other words, a half pressing is used for locking a focus and fixing exposure and the pressing operation in the second step is a full pressing to perform an image capturing or recording operation. As described above, the edge extraction display mode is a monotonous display suitable for checking the edge but is not suitable for checking the target or the composition (framing). When an image of a target is captured in the edge extraction display mode, for example, the image is captured and recorded without colors of the target checked. Also, even when the composition of the target includes portions having similar colors difficult to distinguish from one another, the image is captured and recorded in that state because the colors are not distinguishable in the edge extraction display mode. To solve the problem, when the release button 2 is pressed down to the first step, the mode is switched to the live view image display mode even through the edge extraction display mode is set.

In this manner, the operation of the release button 2 is set to be a condition for changing the display mode, so that photographing can be performed by checking the shape, color, composition of the target when photographing in such a manner that the display mode is automatically changed from the edge extraction mode to the live view image display mode with the release button 2 being pressed halfway in the first pressing operation.

<Focusing Operation>

A case where a focusing operation is used as a condition (this corresponds to claim 6) is described.

Basically, the edge extraction display mode is used when a focusing operation is performed. Although it is not particularly needed when an autofocus is operated, it is desirable that the display mode is automatically changed to the edge extraction display mode when a manual focusing operation is performed. For this reason, the focusing operation is performed by using an operational member such as a focus button or a focus lever, the display mode is changed from the live view image display mode to the edge extraction display mode. Note that when the focusing operation is stopped, the display mode is changed from the edge extraction display mode to the live view image display mode.

In this manner, the focusing operation is used as a condition for the display mode change, and the display mode is automatically changed from the live view image display mode to the edge extraction display mode when the focusing operation is performed using an operational member such as a focusing button or a focusing lever. Accordingly, the display mode can be shifted to the edge extraction display mode needed for the focusing operation without irritating a user. Also, when the focusing operation is terminated, the display mode is returned to the live view image display mode, so that checking the target or the composition which is difficult in the edge extraction display mode can be easily performed.

<Zooming Operation>

A case where a zooming operation is used as a condition (this corresponds to claim 7) is described.

As described above, the edge extraction display mode is a mode effective when a focusing operation is performed and is not suitable for checking the target or the composition. Accordingly, when the zooming operation is performed, it is desirable that the live view image display mode is used. For this reason, when the zooming operation is performed using the zooming operation member such as a zooming button or a zooming lever, the display mode is changed from the edge extraction display mode to the live view image display mode. Then, when the zooming operation is stopped, the display mode is changed from the live view image display mode to the edge extraction display mode. The zooming operation in this case includes a zooming operation using a so-called digital zooming.

In this manner, the zooming operation is set as a condition for the display mode change, so that checking the shape, color or composition of the target, which is needed when the zooming operation is performed and is difficult in the edge extraction display mode, become easily possible when the zooming operation is performed in such a manner that the display mode is automatically changed from the edge extraction display mode to the live view image display mode when the zooming operation is performed using the zooming operation member such as a zooming button or a zooming lever.

<Aperture Stop Operation>

A case where an aperture stop operation is used as a condition (this corresponds to claim 8) is described.

In the edge extraction display mode, only the edge portion of an image is displayed. Accordingly, brightness of a target cannot be accurately recognized, and even when the aperture stop is changed, it cannot be recognized how much the brightness of the target is changed. For this reason, it is desirable that the display mode is automatically changed from the edge extraction display mode to the live view image display mode when the aperture stop is changed in the edge extraction display mode. In this case, when the aperture stop operation is stopped, the display mode is changed from the live view image display mode to the edge extraction display mode. The display mode may be returned to the edge extraction display mode after an image is displayed in the live view image display mode for a proper period of time so that a user can check the brightness of the target by stopping the aperture stop operation.

In this manner, the aperture stop operation is set to be a condition for changing the display mode, so that easily checking the change in the brightness of the target, which is needed when the aperture stop operation is performed and is difficult to recognize in the edge extraction mode becomes possible in such a manner that the display mode is automatically changed from the edge extraction mode to the live view image display mode when the aperture stop operation is performed. Also, when the display mode is returned from the live view image display mode to the edge extraction display mode after the aperture stop operation is terminated, it is further desirable that the display mode is not changed immediately after the aperture stop operation is terminated and the display mode is slowly returned after the brightness of the target is checked.

<Display Enlargement>

Furthermore, when changing a display position at the time of displaying partially enlarged portion is used as the condition (this corresponds to claim 9). Some of digital cameras include a partially-enlarging display mode to display one portion of a live view image in an enlarged manner for allowing a focus state to be easily checked. In such a case, for designation of a portion to be partially enlarged, a key or the like of the operational unit 110 is used to selectively designate an enlargement target portion from the live view image. However, if the display mode of the live view image at that time is the edge extraction display mode, it is difficult to check the target or the composition. For this reason, if the enlargement target portion of the live view image is designated under the edge extraction display mode, the display mode is changed once to the live view image display mode and is then returned to the edge extraction display mode after the designation of the enlargement target position is terminated.

In this manner, the operation of changing and designating the enlargement target portion in the live view image in the partially-enlarging display mode of the live view image is used as a condition for automatically changing the display mode from the edge extraction display mode to the live view image display mode. Thus, since it is not easy to check the target or the composition if the edge extraction display mode is unchanged, the display mode is automatically changed to the live view image display mode when the operation of changing and designating the enlargement target portion is performed, so that the shape, color, composition, and the like of the target can be easily checked.

Hereinafter, changing a background color in the edge extraction mode, which is a characteristic of the invention, in the digital camera configured as above is described in detail as another embodiment of the present invention. This processing is also performed in the first imaging signal processing block 104-1 and the second imaging signal processing block 104-2 based on the control of the CPU block 104-3 in FIG. 1 (this corresponds to claim 10).

[Background Color Changing Processing in Edge Extraction Mode]

Figure 17:
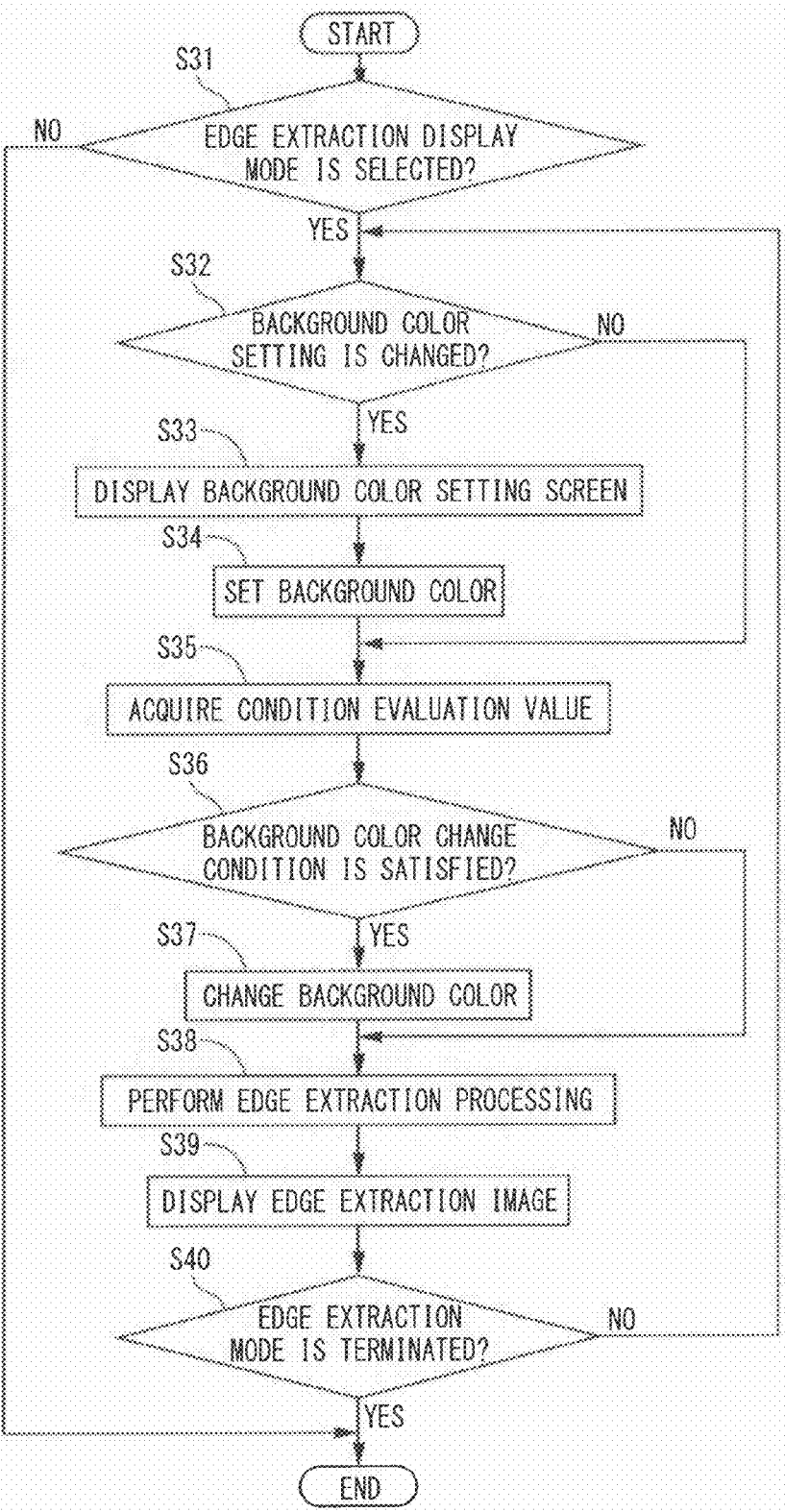
FIG. 17 is a flowchart for illustrating background color changing processing in an edge extraction mode in the digital camera in FIG. 1.

Referring to the flowchart shown in FIG. 17, the processing flow of changing a background color in the edge extraction mode in the digital camera according to the embodiment is described. Note that the background color changing routine in the edge extraction mode is set so as to be executed periodically for each predetermined period of time since a stand-by state or every time an operation relating to the mode change is performed or every time a user selects the edge extraction mode.

Whether the edge extraction mode is selected by a user is firstly determined (step S21), and when the edge extraction mode is not selected, the processing is terminated and returns to the stand-by state.

At step S31, when it is determined that the edge extraction mode is selected, determination is made on whether the background color setting is requested to be changed (step S32), and when it is determined that the background color setting is requested to be changed (step S33), the background color is set (step S34).

After the background color is set at step S34, when it is determined that the background color setting is not requested to be changed at the preceding step S32, a condition evaluation value of changing the background color is acquired (step S35). Determination is made on whether a condition evaluation value acquired at step S25 meets the condition for changing the background color (step S36), and when it is determined that the condition evaluation value meets the condition for changing the background color, the background color is changed (step S37).

After the background color is changed at step S37, when it is determined that the condition evaluation value does not meet the condition for changing the background color, the edge extraction processing is performed (step S38) and the edge extraction image is displayed (step S39).

When the edge extraction image is displayed at step S39, whether termination of the edge extraction mode is requested is determined (step S40), and when the termination of the edge extraction mode is determined to be requested, the processing is terminated and returns to the stand-by state. At step S40, when the termination of the edge extraction mode is determined not to be requested, the processing returns to step S32, and whether the changing of the background color is requested is determined.

[Principle of Background Color Change] (Step S37)

In general, when only an edge is extracted, as shown in FIG. 12B, the edge portion is shown in white (a brightness signal Y corresponds to an extracted edge amount) and the background other than the edge is shown in black (the brightness signal Y is 0). In the present invention, the color in the background portion other than the edge (hereinafter referred to as "a background color") is set to be changeable. More specifically, the background color is changeable with the brightness signal Y and color difference signals Cb/Cr of the background portion other than the edge fixed to designated values.

(Brightness Signal Y Control)

In the processing of creating the edge extraction image like FIG. 12B, the background portion other than the edge is shown by the background color in black because the brightness signal Y is 0. For this reason, when the filter coefficients of LPF described in FIG. 11B are used, a brightness signal offset which is set as needed for the image after the edge emphasizing processing is added to the filter coefficients.

(Color Difference Signal Cb/Cr Control)

As described above, the brightness signal Y is processed in the edge emphasizing processing, while the color difference signals Cb and Cr are processed in the color correction processing. In other words, the color correction processing requires performing control so that the color different signals Cb and Cr are fixed to be a designated color difference. As described above, the control of fixing the color difference signals Cb and Cr to a designated color difference can be achieved by, for example, the following configuration.

Figure 18:
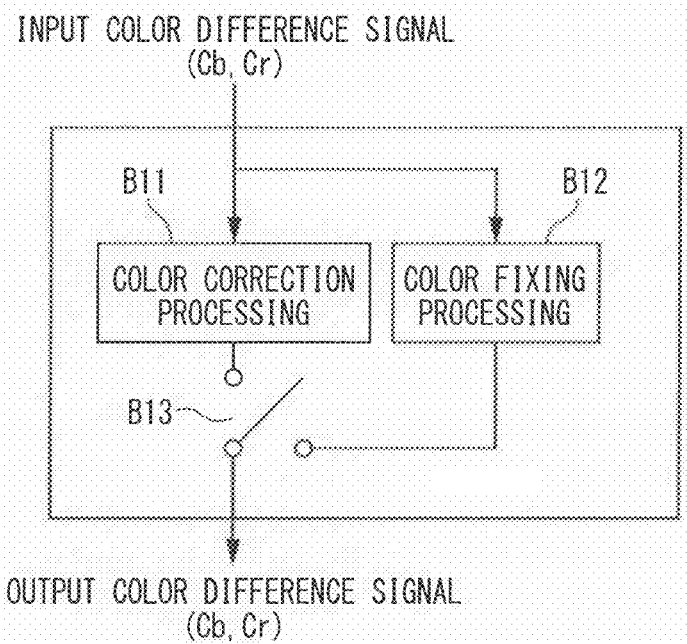
FIG. 18 is a principle block diagram for illustrating processing being selectively applicable of color correction processing in which input color difference signal is subjected to color correction processing or color fixing processing in which a constant color difference signal is output regardless of the input color difference signal, in the color correction processing in the digital camera in FIG. 1.

FIG. 18 schematically shows the configuration in which color fixing processing is added in the color correction processing on the background color. Conventional color correction processing unit B11 and color fixing processing unit 12 are connected in parallel with respect to the input color difference signals Cb and Cr. The switch B13 is provided at an output portion so that an output of the color correction processing result and an output of the color fixing processing result are selectively switched and output. In the color fixing processing, processing is performed so that the color difference signals Cb and Cr which are set in advance are output regardless of the input color difference signals Cb and Cr. Note that the present invention is not limited to the configuration in which the color correction processing unit B11 and the color fixing processing unit B12 are connected with each other in parallel as shown in FIG. 13, but also may be configured so that the color correction processing unit and the color fixing processing unit are disposed in serial and the color fixing processing unit is positioned in a prior step of the final output so that the color fixing processing of the color fixing processing unit can be turned on/off.

[Background Color Setting Screen] (Step S23 and Step S24)

It is desirable that the data of the background color setting screen is prepared in the digital camera, so that a user can set any color using the operation unit 110 in the background color setting screen (this corresponds to claim 11). For example, when the background color is set using the background color setting screen as shown in FIG. 19, in a state where the background color setting screen is being displayed, a hue and saturation are set on the left side of the screen and brightness is set operating a slide bar on the right side of the screen.

Figure 19:
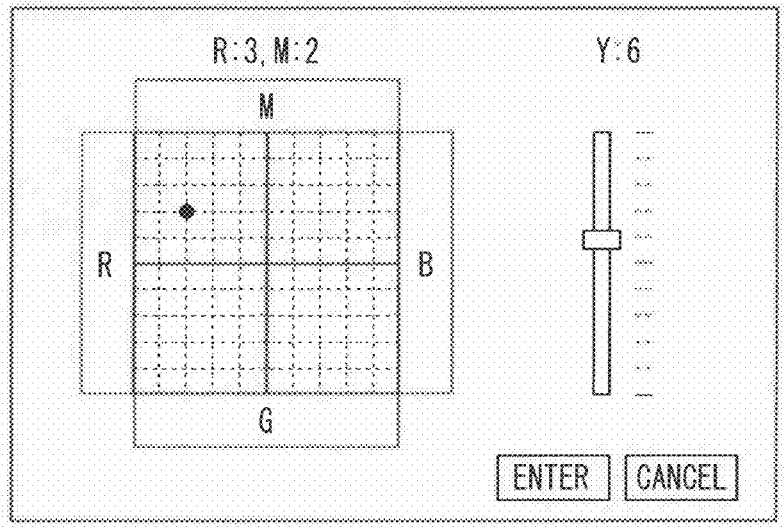
FIG. 19 is a drawing showing an example of a background color setting screen for setting a background color in the edge extraction mode in the digital camera in FIG. 1.

In other words, in the screen of FIG. 19, mixed intensities of respective colors of M (magenta), R (red), G (green), and B (blue) are shown on the left side portion on the screen and Y (brightness) is shown by the slide bar on the right side portion on the screen. Then, the display of "R:3, M:2" on the screen top in FIG. 14 shows that red is 3 and magenta is 2, and the display of "Y:6" shows that 6 is selected as brightness. Here, actual conversion of each value to a set value is described. For example, when the signals Y, Cb, and Cr are all 8-bit signals, a value of the signal Y is 0 to 25 and values of the signals Cb and Cr are −127 to 128. In the case of FIG. 14, the brightness signal Y is set in 10 levels and becomes Y=255/10x (a set value of Y). The color difference signal Cr is converted from the set values of B (blue) and R (red) and become Cb=128/5x (a set value of B) and Cb=−127/5x (a set value of R). Similarly, the color difference signal Cr is converted from the set values of M (magenta) and G (green) and becomes Cr=128/5x (a set value of M) or Cr=−127/5x (a set value of G). Here, if the selected color is displayed on the entire rear surface of the set screen, a selection operation can be performed with the actual color being checked.

The background color of the edge extraction image in the edge extraction mode may conventionally cause a situation in which it is only in achromatic color and poor in color and it is hard to be viewed depending on the circumstance. However, as described above, in the edge extraction mode, the background color of the edge extraction image can be changed, so that a user can set any background color for easily checking the edge depending on the circumstance. Also, the background color can be set according to a user's choice, which increases customizability.

[Holding Multiple Background Color Settings]

As described above, it is desirable that multiple background color settings which were once set be held in the digital camera (this corresponds to claim 12). For example, when the setting values of the signals Y, Cb, and Cr are held in the embedded memory 120 or in the ROM 108 if the ROM 108 is writeable, and any one of the values is read when the background color is set. Note that it is also possible to automatically hold the five setting values in the past.

As described above, when the set information of the multiple background colors is held in the imaging apparatus, a user can select a background color from the previously set background colors as needed and can use the color. Thus there is no need to create the background color again. Accordingly, the background color can be easily changed according to the circumstances such as a photographing environment and a mood.

[Background Color Change According to Condition] (Steps S25 to S27)

It is preferable that the background color change setting is changed according to the condition.

Figure 20:
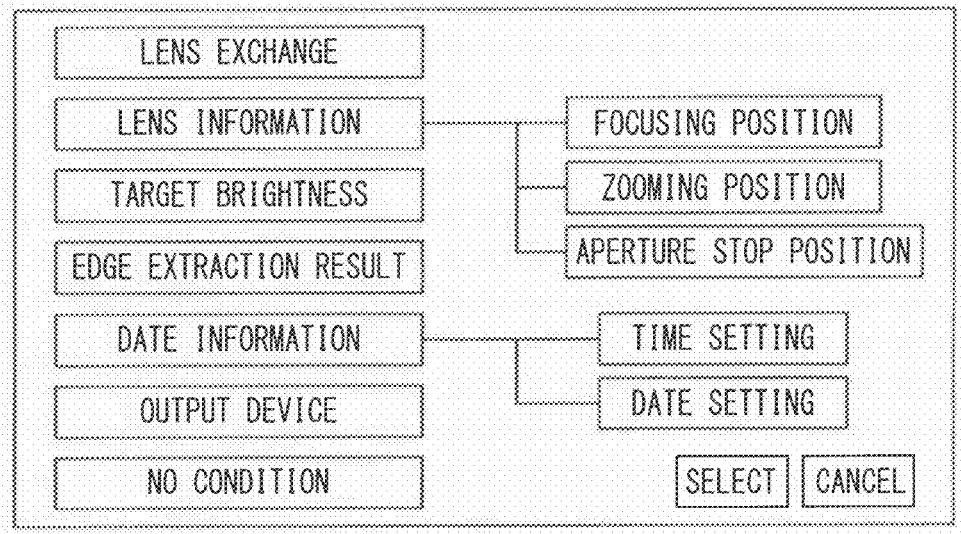
FIG. 20 is a drawing showing an example of a background color changing condition setting screen for setting a condition for changing a background color in the edge extraction mode in the digital camera in FIG. 1.

When the background color is changed according to the condition, the condition for changing to the background setting is also set. For example, a condition selection screen to change the background color as shown in FIG. 20 is prepared in advance, and a user selects by operating the operation unit 110. For example, FIG. 20 shows a state where a zooming position of the lens information is selected as the condition. When the condition to change the background color is set, an evaluation value for determining the condition is acquired. Hereinafter, an example of changing the background color with various conditions is described.

[Background Color Change in Response to Lens Exchange]

When a body of a digital camera, that is, a camera body side includes a section configured to determine a lens type of the mounted lens unit 18 in the CPU block 104-3 of the camera processor 104 through the electrical contact 17 of FIG. 1, the background color may be associated with each interchangeable lens (this corresponds to claim 13). In other words, a background color is set for each interchangeable lens in advance, and when the interchangeable lens is mounted, the type of the mounted lens is used as an evaluation value and the background color for the lens is automatically set.

As described above, when the background color is changed according to the mounted interchangeable lens upon lens exchange, the background color suitable for the mounted lens can be set depending on the lens characteristic. In addition, when the different background colors are set for respective lenses, the type of the mounted interchangeable lens can be recognized by viewing the background color in the edge extraction mode.

[Background Color Change According to Edge Extraction Result]

Figure 21:
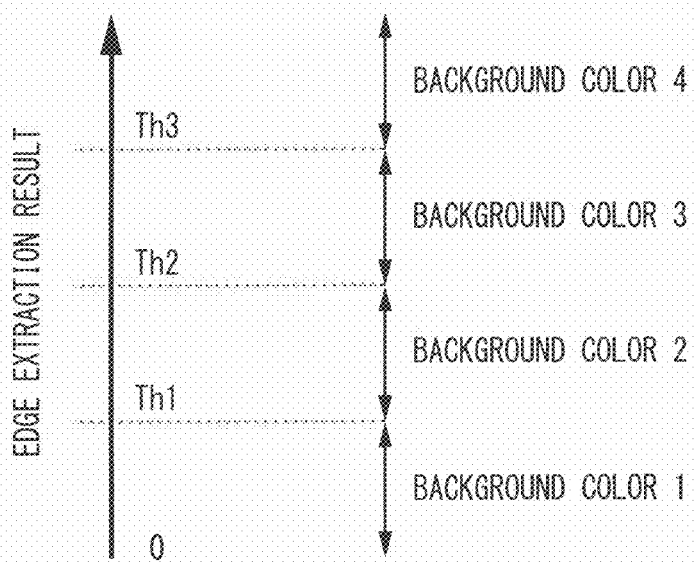
FIG. 21 is a schematic drawing for illustrating processing of changing a background color according to a level (a peaked value or average value) of the edge extraction result in the extraction mode in the digital camera in FIG. 1.

In addition, the edge extraction result may be used as an evaluation value and the background color may be changed according to the edge extraction result (this corresponds to claim 14). The edge extraction result to be used includes a peaked value or an average value. For example, as shown in FIG. 21, the level range is set by several thresholds (thresholds Th1 to Th3) for the edge extraction result such as a peaked value or an average value. Then, background colors (for example, background color 1 to background color 4) which are set in advance for each level range are adapted to be changed depending on that the edge extraction result is included in which level range (for example, 0 to Th1, Th1 to Th2, Th2 to Th3). When the background color is changed, a degree of the focus state of the focus can be more easily recognized.

In this manner, the level of the edge extraction result becomes higher when the focus is on.

Accordingly, the background color is adapted to be changed according to the value of the edge extraction result because the level of the edge extraction result becomes higher when the focus is on, so that the level of the focusing degree of the focus can be checked only by viewing the background color.

[Background Color Change Based on Lens Information]

As shown in FIG. 1, communication units such as the electrical contacts 17 are respectively provided on the lens unit 18 and the camera body of the digital camera. When the camera body side has the configuration in which at least one of the focusing position, zooming position, and aperture stop setting of the mounted lens unit 18 can be recognized through the electrical contacts 17 or the like, the background color may be changed based on the lens information (this corresponds to claim 15 to claim 17).

For example, the focusing position of the lens unit 18 is acquired as an evaluation value and information on the distance of focusing on a target with respect to the focusing position is held in advance on the camera body side, the focusing position is converted to a target focal length, and the background color may be changed according to this target focal length (this corresponds to claim 15).

As described above, the background color is changed depending on the focusing position of the mounted interchangeable lens, so that the focusing position, that is, the target focal length can be recognized only by viewing the background color.

Also, when the lens unit 18 is a zoom lens capable of changing a focal length, an operation almost similar to the case of the focusing position may be applied to the zooming position. Specifically, information on the zooming magnification is held in advance on the camera body side in association with the zooming position, the zooming magnification is obtained from the zooming position, and the background color is changed depending on this zooming magnification (this corresponds to claim 16).

As described above, the background color is changed depending on the zooming position of the mounted interchangeable lens, so that the zooming position, that is, the zooming magnification can be recognized only by viewing the background color.

In addition, with regard to the aperture stop setting value, as the aperture stop setting value (F number) becomes larger, a target depth becomes deeper and the focusing position becomes more difficult to recognize. Accordingly, when the aperture stop setting value becomes equal to or larger than any specific aperture stop setting set in advance, the background color may be set to be darker so that the edge outstands (this corresponds to claim 17).

As described above, the background color is changed according to the aperture stop setting of the mounted interchangeable lens, so that the aperture stop setting state can be recognized only by viewing the background color. Also, since the target depth is deep when the setting of the aperture stop value is large and the aperture stop is narrowed down, the edge is difficult to view. However, the background color is changed according to the aperture stop setting value, so that the visibility of the edge can be improved.

[Background Color Change Based on Time/Date]

In general, a digital camera includes a timer such as a so-called calendar clock timer which outputs time and date information, and the background color may be changed by at least one of the time and date.

When the background color is changed according to the time, for example, hours are divided into four time slots of morning, noon, afternoon, and night, and background colors for the time slots are respectively set in advance. Then, the background color for the time slot to which a current time belongs is used (this corresponds to claim 10).

As described above, the background color is changed according to the time of photographing, so that the time can be recognized only by checking the background color or the background color can be set in a color most suitable for each time.

Also, in the case where the background color is changed according to the date, background colors are set in advance for seasons of spring, summer, autumn, and winder, for example, and the background color for the season to which the date of using the digital camera belongs is displayed. Furthermore, a background color may be set in advance only for a special day such as a birthday and held in the digital camera, and then the background color may be changed to the background color used only for the special day (this corresponds to claim 11).

As described above, the background color is adapted to be changed according to the time and date of photographing, so that the background color can be changed for each of the month, a day of the week, or a special day. Accordingly, the season or the day of the week can be felt only by viewing the background color and thus the mood for the moment of photographing can be set.

[Background Color Change Based on Output Device]

Furthermore, the image by the edge extraction mode can be output and displayed on an external display device connected via the video connector 119 in addition to be output and displayed on the LCD monitor 10 mounted on the digital camera. In addition, an external electronic view finder (EVF: Electronic View Finder) is sometimes loadable on a recent digital camera. Accordingly, the background color may be changed in association with each display device such as the LCD monitor output mounted on the digital camera, the video jack output and the EVF output (this corresponds to claim 18). In other words, the background colors respectively for the LCD monitor output, the video jack output, and the EVF output are held in advance, and when the output display device is switched, the background color for the output device is read and displayed. In doing so, a difference in color representation due to a difference between characteristics of the display devices can be removed and thus an easily viewable color can be set for each display device.

As described above, the background color is changed according to the display device displaying the edge extraction image in the edge extraction mode, so that the difference of the color representation due to the difference of the characteristics of the display devices can be reduced or eliminated. Thus, an easily viewable background color can be set for each display device.

[Background Color Change According to Target Brightness]

Also, the background color may be changed according to the target brightness (this corresponds to claim 19). The description is given to processing of changing the background color according to the target brightness. A brightness average value of the target is calculated from a live view image. For the brightness average value, thresholds and background colors for respective brightness ranges defined by the thresholds are set in advance. When the brightness of the live view image is changed with a change in the composition by moving an image pickup view field of the digital camera, the background color is changed with the change in the brightness average value. Here, completely different colors may be set as the background color for the brightness average value. However, a screen color is expected to change with a high frequency because the brightness average value easily changes with the change of the composition. For this reason, with regard to the signal Y and the setting values of Cb and Cr of the background color, only the brightness signal Y is changed without changes of the values of the color difference signals Cb and Cr. In this case, the hue of the background color remains the same and only the brightness is changed. The brightness becomes higher as the target brightness becomes higher, and the brightness becomes lower as the target brightness become lower. Accordingly, the visibility of the edge in the edge extraction image can be improved.

As described above, a change of the background color according to the target brightness makes it possible to makes the background color brighter for a bright target and darker for a dark target even while using the same background color. In this way, the display can be made such that the edge can be easily viewed for every circumstance.

[Background Color Change According to Gain of Imaging Element]

Furthermore, the background color may be changed according to a gain of the imaging element (this corresponds to claim 20). In the live view image in the digital camera, the gain, that is, the sensitivity of the imaging element 101 is changed according to the target brightness. It is a common practice that, when the target brightness is low, the gain value is controlled and is set to be high to increase the visibility of the target. Accordingly, for the gain value of the imaging element 101, thresholds and background colors for respective gain ranges defined by the thresholds are set in advance. As similar to the case of changing the background color according to the target brightness, when the brightness of the live view image is changed with a change of the composition by moving the image pickup view filed of the digital camera, the gain of the imaging element 101 is controlled accordingly to change the gain value, and thereby to change the background color. Completely different colors may be set as the background colors for the gain value of the imaging element 101. However, a screen color is expected to change with a high frequency because the gain value of the imaging element 101 easily changes with the change of the composition. For this reason, with respect to the signals Y, Cb, and Cr of the background color, only the brightness signal Y is changed without changes of the values of the color difference signals Cb and Cr. In this case, the hue of the background color remains the same and only the brightness is changed. When the gain value of the imaging element 101 is low (the target brightness is high), the brightness is set to be high, while when the gain value of the imaging element 101 is high (the target brightness is low), the brightness is set to be low. This enables improvement in the visibility of edges in an edge extraction image, and suppresses an increase in noise when the gain value of the imaging element 101 is high according to a low target brightness.

As described above, the background value is changed according to the setting value of the gain set for the imaging element 101. Thus, the visible noises generated on the live view image can be reduced by setting the brightness of the background color to be low when the gain value is high.

The embodiment of the present invention can provide an imaging apparatus effectively usable as an electronic finder to provide a live view image for checking a target composition before photographing and enabling a user to effectively and readily perform framing and focus adjustment while viewing the image.

In other words, the imaging apparatus according to the embodiment of the present invention includes: an imaging lens configured to form a target optical image of a target; an imaging device configured acquire a captured image by converting the target optical image formed by the imaging lens into image data by an imaging element; an image processor configured to perform image processing on the captured image acquired by the imaging device; and an image display configured to display an image obtained through the image processor, wherein the image processor has: an edge extraction unit configured to obtain an edge extraction image by extracting an edge of the captured image; a display processor having an edge extraction display mode in which the edge extraction image by the edge extraction unit is provided to and displayed by the image display, and a normal image display mode in which the captured image not via the edge extraction unit is provided to and displayed by the image display; and a mode selection unit configured to selectively switch between the edge extraction display mode and the normal image display mode of the display processor based on a predetermined condition.

Thereby, the edge extraction display mode and the normal image display mode are switched according to the predetermined condition, and display is performed by using respective advantages and compensating respective drawbacks of the edge extraction display mode and the normal image display mode, so that a user can easily and effectively perform framing and focus adjustment while viewing an image.

The embodiment of the present invention also provides an imaging apparatus, including: an imaging lens configured to form a target optical image of a target; an imaging device configured to acquire a captured image by converting the target optical image formed by the imaging lens into image data by an imaging element; an image processor configured to perform image processing on the captured image acquired by the imaging device; and an image display configured to display an image obtained through the image processor, wherein the image processor includes: an edge extraction unit configured to obtain an edge extraction image by extracting an edge of the captured image; a background color changing unit configured to change a background color in a region other than the edge in the edge extraction image by the edge extraction unit according to a preset condition, and a display processor configured to provide the edge extraction image having the background color changed by the background color changing unit to the image display.

The embodiment of the present invention also provides an imaging apparatus, including: an imaging lens having a focus adjustment mechanism, the imaging lens configured to form a target optical image of a target; an imaging device configured to acquire a captured image by converting the target optical image formed by the imaging lens into image data by an imaging element; an image processor configured to perform image processing on the captured image acquired by the imaging device; and an image display configured to display an image obtained through the image processor, wherein the image processor includes: an edge extraction unit configured to obtain an edge extraction image by extracting an edge of the captured image; a background color changing unit configured to change a background color in a region other than the edge in the edge extraction image by the edge extraction unit according to a preset condition, and a display processor having an edge extraction mode configured to provide the edge extraction image having the background color changed by the background color changing unit to the image display when providing the captured image by the imaging device to the image display as a live view image, and displaying the live view image in real time.

Although the embodiments of the present invention have been described above, the present invention is not limited thereto. It should be appreciated that variations may be made in the embodiments described by persons skilled in the art without departing from the scope of the present invention.

What is claimed is:

1. An imaging apparatus, comprising:
an imaging lens configured to form a target optical image of a target;
an imaging device configured to acquire a captured image by converting the target optical image formed by the imaging lens into image data by an imaging element;
an image processor configured to perform image processing on the captured image acquired by the imaging device; and
an image display configured to display an image obtained through the image processor, wherein
the image processor includes:
an edge extraction unit configured to obtain an edge extraction image by extracting an edge of the captured image;
a display processor having an edge extraction display mode in which the edge extraction image by the edge extraction unit is provided to and displayed by the image display, and a normal image display mode in which the captured image not via the edge extraction unit is provided to and displayed by the image display; and
a mode selection unit configured to selectively switch between the edge extraction display mode and the normal image display mode of the display processor based on the sensing by the imaging apparatus of a predetermined condition,
wherein the mode selection unit includes a section configured to set, as a predetermined condition in advance, a level range of an edge extraction result of an edge extracted by the edge extraction unit, and to select any one of the edge extraction display mode and the normal image display mode according to a change in the level of the edge extraction result.

2. The imaging apparatus according to claim 1,
wherein the mode selection unit includes a section configured to set as the predetermined condition in advance, a target brightness range, and to select any one of the edge extraction display mode and the normal image display mode in response to a change in target brightness.

3. The imaging apparatus according to claim 1,
wherein the mode selection unit includes a section configured to set as the predetermined condition in advance, a range of a gain value of the imaging element of the imaging device controlled according to the target brightness, and to select any one of the edge extraction display mode and the normal image display mode according to the gain value of the imaging element.

4. The imaging apparatus according to claim 1,
further comprising a release button configured to operate and instruct a focus lock and image recording with a pressing operation, wherein
the mode selection unit includes a section configured to use, as the predetermined condition, an event of the focus lock operation of the release button, and to select the normal image display mode in response to the focus lock operation even when the edge extraction display mode is selected.

5. The imaging apparatus according to claim 1,
further comprising a manual focusing unit configured to perform a manual focusing operation, wherein
the mode selection unit includes a section configured to use, as the predetermined condition, an event of the manual focusing operation of the manual focusing unit, and to select the edge extraction display mode in response to only the manual focusing operation while selecting the normal image display mode otherwise.

6. The imaging apparatus according to claim 1,
further comprising a zooming unit configured to perform zooming, wherein
the mode selection unit includes a section configured to use, as the predetermined condition, an event of the zooming operation of the zooming unit, and to, even when the edge extraction display mode is selected, to select the normal image display mode in response to only the zooming operation while selecting the edge extraction display mode otherwise.

7. The imaging apparatus according to claim 1,
further comprising an aperture stop unit configured to perform an aperture stop operation, wherein
the mode selection unit includes a section configured to use, as the predetermined condition, an event of the aperture stop operation of the aperture stop operation unit, and to, even when the edge extraction display mode is selected, to select the normal image display mode in response to only the aperture stop operation while selecting the edge extraction display mode otherwise.

8. The imaging apparatus according to claim 1, wherein the display processor further includes a partially-enlarging display function to enlarge a designated portion of the captured image and to provide the enlarged portion to the image display for display, and the mode selection unit includes a section configured to use, as the predetermined condition, an event of an instruction operation to change an enlarged display portion in the partially-enlarged display by the partially-enlarging display function, and to, even when the edge extraction display mode is selected, to select the normal image display mode in response to only the instruction operation to change the enlarged display portion while selecting the edge extraction display mode otherwise.

9. An imaging apparatus, comprising:

an imaging lens configured to form a target optical image of a target;

an imaging device configured to acquire a captured image by converting the target optical image formed by the imaging lens into image data by an imaging element;

an image processor configured to perform image processing on the captured image acquired by the imaging device; and an image display configured to display an image obtained through the image processor, wherein the image processor includes:

an edge extraction unit configured to obtain an edge extraction image by extracting an edge of the captured image;

a display processor having an edge extraction display mode in which the edge extraction image by the edge extraction unit is provided to and displayed by the image display, and a normal image display mode in which the captured image not via the edge extraction unit is provided to and displayed by the image display; and a mode selection unit configured to selectively switch between the edge extraction display mode and the normal image display mode of the display processor based on the sensing by the imaging apparatus of a predetermined condition, wherein the image processor includes a background color changing unit configured to change a background color in a region other than the edge in the edge extraction image by the edge extraction unit according to a preset condition, and the display processor provides the edge extraction image having the background color changed by the background color changing unit to the image display in the edge extraction display mode.

10. The imaging apparatus according to claim 9, further comprising a section configured to set a color desired by a user in advance as a post-change background color in the background color change of the edge extraction image by the background color changing unit.

11. The imaging apparatus according to claim 9, further comprising a section configured to hold a plurality of settings of post-change background colors in the background color change of the edge extraction image by the background color changing unit.

12. The imaging apparatus according to claim 9, wherein the imaging lens includes a plurality of interchangeable lenses being imaging lenses which are each detachably mountable and one of which is selectively mounted, the imaging apparatus comprises a section configured to determine a type of the interchangeable lens, and the background color changing unit is a unit configured to set a background color in advance for each of the imaging lenses of the interchangeable lenses with the imaging lens used as the preset condition, and to change the background color in response to an exchange of the imaging lenses.

13. The imaging apparatus according to claim 9, wherein the background color changing unit is a unit configured to set a background color in advance for each level range of the edge extraction result extracted by the edge extraction unit with the level range used as the preset condition, and to change the background color in response to a level change of the edge extraction result.

14. The imaging apparatus according to claim 9, wherein the background color changing unit is a unit configured to set a background color in advance for a target distance determined based on a focusing position of the mounted imaging lens with the target distance used as the preset condition, and to change the background color according to the target distance determined based on the focusing position of the imaging lens.

15. The imaging apparatus according to claim 9, wherein the imaging lenses include a zoom lens capable of changing a focal length and the background color changing unit is a unit configured to set a background color in advance for a zooming position of the mounted imaging lens with the zooming position used as the preset condition, and to change the background color according to the zooming position of the imaging lens.

16. The imaging apparatus according to claim 9, wherein the background color changing unit is a unit configured to set a background color in advance for an aperture stop setting of the mounted imaging lens with the aperture stop setting used as the preset condition, and to change the background color according to the aperture stop setting of the imaging lens.

17. The imaging apparatus according to claim 9, wherein the image display is configured as a display unit configured to selectively use a plurality of display devices for display, and the background color changing unit is a unit configured to set a background color in advance for each of the display devices used for display with the display device used as the preset condition, and to change the background color corresponding to the display device used for display.

18. The imaging apparatus according to claim 9, wherein the background color changing unit is a unit configured to set a background color in advance for target brightness of a target to be photographed by the imaging device with the target brightness used as the predetermined condition, and to change the background color according to the target brightness of the target to be photographed.

19. The imaging apparatus according to claim 9, wherein the background color changing unit is a unit configured to set a background color in advance for a gain value of the imaging element controlled according to the target brightness with the gain value used as the preset condition, and to change the background color according to the gain value of the imaging element.

* * * * *